US012454439B2

(12) United States Patent
Kitano et al.

(10) Patent No.: US 12,454,439 B2
(45) Date of Patent: Oct. 28, 2025

(54) PEOPLE FLOW PREDICTION METHOD AND PEOPLE FLOW PREDICTION SYSTEM

(71) Applicant: Hitachi, Ltd., Tokyo (JP)

(72) Inventors: Yu Kitano, Tokyo (JP); Akinori Asahara, Tokyo (JP); Naoki Shimode, Tokyo (JP); Nobuo Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1344 days.

(21) Appl. No.: 17/255,835

(22) PCT Filed: May 10, 2019

(86) PCT No.: PCT/JP2019/018682
§ 371 (c)(1),
(2) Date: Dec. 23, 2020

(87) PCT Pub. No.: WO2020/003761
PCT Pub. Date: Jan. 2, 2020

(65) Prior Publication Data

US 2021/0276824 A1 Sep. 9, 2021

(30) Foreign Application Priority Data

Jun. 26, 2018 (JP) ................................ 2018-121057

(51) Int. Cl.
*B66B 1/34* (2006.01)
*B66B 1/24* (2006.01)
(Continued)

(52) U.S. Cl.
CPC .............. *B66B 1/3476* (2013.01); *B66B 1/24* (2013.01); *B66B 1/3446* (2013.01); *B66B 3/002* (2013.01); *B66B 5/0012* (2013.01)

(58) Field of Classification Search
CPC ....... B66B 1/3476; B66B 1/24; B66B 1/3446; B66B 3/002; B66B 5/0012
See application file for complete search history.

(56) References Cited

U.S. PATENT DOCUMENTS 4,303,851 A * 12/1981 Mottier .................... G07C 9/00 377/6
4,536,842 A * 8/1985 Yoneda ................ B66B 1/2458 187/387
(Continued)

FOREIGN PATENT DOCUMENTS

GB 2555747 A 5/2018
JP 64-69480 A 3/1989
(Continued)

OTHER PUBLICATIONS

International Search Report (PCT/ISA/210) issued in PCT Application No. PCT/JP2019/018682 dated Aug. 13, 2019 with English translation (five (5) pages).
(Continued)

*Primary Examiner* — Jianchun Qin
(74) *Attorney, Agent, or Firm* — Crowell & Moring LLP

(57) ABSTRACT

A people flow prediction system and method are provided, in which a first conversion model for converting virtual getting in and out data before a certain time point into a number of people who appear after the certain time point and a second conversion model for converting the virtual getting in and out data after a certain time point into the number of people who appear before the certain time point are created based on the number of people who appear and the virtual getting in and out data. A prediction model is learned based on the number of people who appear converted by the second conversion model, and a number of people who appear after a certain time point is predicted from the on-site getting in and out data before the certain time point by using the first conversion model and the prediction model.

11 Claims, 17 Drawing Sheets

(51) Int. Cl.
*B66B 3/00* (2006.01)
*B66B 5/00* (2006.01)

(56) References Cited

U.S. PATENT DOCUMENTS

| | | | |
|---|---|---|---|
| 4,838,384 A | 6/1989 | Thangavelu | |
| 2011/0220437 A1* | 9/2011 | Asano | B66B 1/2458 187/247 |
| 2021/0400433 A1* | 12/2021 | Igarashi | G06Q 10/02 |

FOREIGN PATENT DOCUMENTS

| | | | | |
|---|---|---|---|---|
| JP | 2-48380 A | | 2/1990 | |
| JP | 7-215607 A | | 8/1995 | |
| JP | 2010-6613 A | | 1/2010 | |
| JP | 4995248 B2 | * | 8/2012 | |
| JP | 2013-173595 A | | 9/2013 | |
| JP | 2014-172718 A | | 9/2014 | |
| JP | 5879152 B2 | * | 3/2016 | |
| JP | 2017-178475 A | | 10/2017 | |
| JP | 2019-81634 A | | 5/2019 | |
| WO | WO 2017/006379 A | | 1/2017 | |
| WO | WO-2018012044 A1 | * | 1/2018 | B66B 1/468 |

OTHER PUBLICATIONS

Japanese-language Written Opinion (PCT/ISA/237) issued in PCT Application No. PCT/JP2019/018682 dated Aug. 13, 2019 (three (3) pages).

* cited by examiner

FIG. 4A

ON-SITE GETTING IN AND OUT DB (CAR STATE)

400

| TIME AND DATE (401) | CAR NUMBER (402) | FLOOR (403) | WEIGHT (404) | CAR PARAMETER 1 (405) | ... |
|---|---|---|---|---|---|
| 2018-01-01 07:00:00 | 1 | 5F | 10 | ... | ... |
| 2018-01-01 07:00:01 | 1 | 5F | 10 | ... | ... |
| 2018-01-01 07:00:02 | 1 | 5F | 10 | ... | ... |
| : | : | : | : | ... | ... |
| : | : | : | : | ... | ... |

FIG. 4B

ON-SITE GETTING IN AND OUT DB (CALL STATE)

410

| TIME AND DATE (411) | FLOOR (412) | UP CALL (413) | DN CALL (414) | CALL PARAMETER 1 (415) | ... |
|---|---|---|---|---|---|
| 2018-01-01 07:00:00 | 5F | 1 | 1 | ... | ... |
| 2018-01-01 07:00:01 | 5F | 1 | 0 | ... | ... |
| 2018-01-01 07:00:02 | 5F | 0 | 0 | ... | ... |
| : | : | : | : | ... | ... |
| : | : | : | : | ... | ... |

FIG. 4C

ON-SITE GETTING IN AND OUT DB (ON-SITE GETTING IN AND OUT DATA)

420

| TIME AND DATE (421) | DEPARTURE FLOOR (422) | DESTINATION FLOOR (423) | NUMBER OF PEOPLE (424) |
|---|---|---|---|
| 2018-01-01 07:00:00 | 1F | 5F | 5 |
| 2018-01-01 07:00:00 | 1F | 8F | 3 |
| 2018-01-01 07:01:00 | 3F | 1F | 1 |
| : | : | : | : |
| : | : | : | : |

FIG. 5A

SIMULATION DB (VIRTUAL TRAFFIC DEMAND)

500

| TIME AND DATE (501) | DEPARTURE FLOOR (502) | DESTINATION FLOOR (503) |
|---|---|---|
| 2018-01-01 07:00:00 | 1F | 5F |
| 2018-01-01 07:00:03 | 1F | 8F |
| 2018-01-01 07:01:05 | 3F | 1F |
| : | : | : |
| : | : | : |

FIG. 5B

SIMULATION DB (CAR STATE)

510

| TIME AND DATE (511) | CAR NUMBER (512) | FLOOR (513) | WEIGHT (514) | CAR PARAMETER 1 (515) | ... |
|---|---|---|---|---|---|
| 2018-01-01 07:00:00 | 1 | 5F | 10 | ... | ... |
| 2018-01-01 07:00:01 | 1 | 6F | 9 | ... | ... |
| 2018-01-01 07:00:02 | 1 | 8F | 9 | ... | ... |
| : | : | : | : | ... | ... |
| : | : | : | : | ... | ... |

FIG. 5C

SIMULATION DB (CALL STATE)

520

| TIME AND DATE (521) | FLOOR (522) | UP CALL (523) | DN CALL (524) | CALL PARAMETER 1 (525) | ... |
|---|---|---|---|---|---|
| 2018-01-01 07:00:00 | 5F | 1 | 0 | ... | ... |
| 2018-01-01 07:00:01 | 5F | 1 | 0 | ... | ... |
| 2018-01-01 07:00:02 | 5F | 0 | 1 | ... | ... |
| : | : | : | : | ... | ... |
| : | : | : | : | ... | ... |

MODEL DB (PAST GETTING IN AND OUT/APPEARANCE CONVERSION MODEL)

701 702 703 700

| DATE | MODEL PARAMETER 1 | MODEL PARAMETER 2 | ... |
|---|---|---|---|
| 2018-01-01 | 0.0 | 1.5 | ... |
| 2018-01-02 | 1.5 | 0.5 | ... |
| 2018-01-03 | 0.1 | 2.6 | ... |
| : | : | : | ... |
| : | : | : | ... |

CONVERTED APPEARANCE DB (PAST GETTING IN AND OUT/APPEARANCE CONVERSION)

900

| TIME AND DATE (901) | DEPARTURE FLOOR (902) | DESTINATION FLOOR (903) | NUMBER OF PEOPLE (904) |
|---|---|---|---|
| 2018-01-01 07:00:00 | 1F | 6F | 4 |
| 2018-01-01 07:00:00 | 2F | 7F | 2 |
| 2018-01-01 07:01:00 | 5F | 2F | 2 |
| : | : | : | : |
| : | : | : | : |

MODEL DB (FUTURE GETTING IN AND OUT/APPEARANCE CONVERSION MODEL)

1100

| DATE (1101) | MODEL PARAMETER 1 (1102) | MODEL PARAMETER 2 (1103) | ... |
|---|---|---|---|
| 2018-01-01 | 0.1 | 1.7 | ... |
| 2018-01-02 | 1.4 | 0.3 | ... |
| 2018-01-03 | 0.4 | 3.6 | ... |
| : | : | : | ... |
| : | : | : | ... |

CONVERTED APPEARANCE DB (FUTURE GETTING IN AND OUT/APPEARANCE CONVERSION)

1300

| TIME AND DATE (1301) | DEPARTURE FLOOR (1302) | DESTINATION FLOOR (1303) | NUMBER OF PEOPLE (1304) |
|---|---|---|---|
| 2018-01-01 07:00:00 | 1F | 5F | 4 |
| 2018-01-01 07:00:00 | 1F | 9F | 2 |
| 2018-01-01 07:01:00 | 4F | 1F | 2 |
| : | : | : | : |
| : | : | : | : |

FIG. 15

MODEL DB (PREDICTION MODEL)

1500

| DATE (1501) | MODEL PARAMETER 1 (1502) | MODEL PARAMETER 2 (1503) | ... |
|---|---|---|---|
| 2018-01-01 | 0.5 | 2.2 | ... |
| 2018-01-02 | 3.2 | 1.1 | ... |
| 2018-01-03 | 0.6 | 4.5 | ... |
| : | : | : | ... |
| : | : | : | ... |

PEOPLE FLOW PREDICTION METHOD AND PEOPLE FLOW PREDICTION SYSTEM

INCORPORATION BY REFERENCE

This application claims the benefit of priority of the prior Japanese Patent Application No. 2018-121057, filed on Jun. 26, 2018, the entire contents of which are incorporated herein by reference.

TECHNICAL FIELD

The present invention relates to prediction of traffic demand for an elevator or the like.

BACKGROUND ART

In a building such as an office building, an elevator group management system has been introduced in which a plurality of elevators is installed side by side to improve transport capacity of the elevators and an optimum car is selected and controlled upon registration of a call at a landing. In such elevator operation control, in order to reduce waiting time or the like for a user, the elevator group management system performs operation control by predicting elevator usage status by using operation data or the like. As a technique of predicting the elevator usage status, for example, there are techniques described in JP 2014-172718 A (PTL 1) and WO 2017/006379 A (PTL 2).

It is stated in PTL 1 that "An elevator traffic demand prediction device capable of correctly predicting traffic demand in a building is provided. The elevator traffic demand prediction device according to one embodiment includes an acquisition unit, a calculation unit, a feature quantity database, a prediction unit, and a selection unit. The acquisition unit acquires elevator control results including a getting-in load and the getting-out load for each moving direction and each floor. The calculation unit calculates a traffic demand feature quantity including a category feature quantity indicating the category of the traffic demand on the basis of the elevator control results. The feature quantity of the traffic demand calculated is recorded in the feature quantity database in association with attribute information and time point information. The prediction unit includes a plurality of experts which predicts the category of a traffic demand and creates prediction values by referring to different pieces of data included in the feature quantity database, and adopts one of the prediction values as a prediction result. The selection unit selects a control method according to the prediction result from a plurality of control methods prepared in advance."

It is stated in PTL 2 that "There are provided a novel group-control elevator device and a novel method for allocating boarding car numbers using group control which are capable of improving user transport capacity by inhibiting the occurrence of long waits for users at a landing around a future time point at which congestion is predicted. Landing arrival times of a plurality of users and current operation information of each boarding car number are used to predict a future congested status and to group the users. Boarding car numbers corresponding to each group are temporarily allocated on the basis of the grouped information. A boarding car number that departs before a predicted congestion time point at which congestion is predicted is adjusted using predetermined conditions such that a predicted arrival time point at which the boarding car number will arrive at the landing again is around the predicted congestion time point at which congestion is predicted, and the adjusted boarding car number is determined as a boarding car number which will arrive around the predicted congestion time point at which congestion is predicted. Accordingly, an elevator car can be smoothly dispatched to the landing around a congestion time point at which a congested status is predicted."

CITATION LIST

Patent Literature

PTL 1: JP 2014-172718 A
PTL 2: WO 2017/006379 A

SUMMARY OF INVENTION

Technical Problem

It is required to predict the number of people who will reach an elevator hall in the future (that is, the number of people who will appear in the future) and the destination floor and the like for each floor. However, in each of PTL 1 and PTL 2, since the number of people in the elevator car is used, the status of the getting-in floor and the getting-out floor can be known; however, the status of the elevator hall cannot be known.

The true value of the number of people who appear is required to acquire information of a sensor mounted on the elevator (for example, the number of people getting in and out for each floor) and to use machine learning or the like to create a prediction model for predict the number of people who will reach the elevator hall in the future on the basis of the information. If a camera or the like is installed in the elevator hall on each floor, the true value of the number of people who appear can be obtained; however, the cost of installation is very high and therefore it is difficult to actually install the camera or the like.

Solution to Problem

In order to solve at least one of the above problems, the present invention is a people flow prediction method executed by a computer system having a processor and a storage device connected to the processor, the method including a number of people getting in and out calculating procedure in which the processor calculates the number of people who got in an elevator in the past on the basis of information of a sensor installed in the elevator and creates on-site getting in and out data including the number of people calculated, a simulation data creating procedure in which the processor creates virtual getting in and out data including at least the number of people who get in the elevator by making a person who arrives at each of landings of the elevator in order to use the elevator virtually appear and simulating operation of the elevator on the basis of the number of people who appear, a first conversion model creating procedure in which the processor creates a first conversion model for converting the virtual getting in and out data before a certain time point into the number of people who appear after the certain time point on the basis of the number of people who appear and the virtual getting in and out data, a second conversion model creating procedure in which the processor creates a second conversion model for converting the virtual getting in and out data after a certain time point into the number of people who appear before the certain time point on the basis of the number of people who appear and the virtual getting in and out data, a prediction model learning procedure in which the processor learns a prediction model for predicting the number of people who appear after a certain time point from the number of people who appear before the certain time point on the basis of the number of people who appear converted by the second conversion model, and a predicting procedure in which the processor predicts the number of people who appear after a certain time point from the on-site getting in and out data before the certain time point by using the first conversion model and the prediction model.

Advantageous Effects of Invention

According to one aspect of the present invention, it is possible to realize operation of an elevator that improves user satisfaction without the need for expensive equipment such as a camera in an elevator hall. Problems, configurations, and effects other than those described above will be apparent from the following description of the embodiments below.

BRIEF DESCRIPTION OF DRAWINGS

FIG. 4A is an explanatory diagram of car state data included in an on-site getting in and out database of Embodiment 1 of the present invention.

FIG. 4B is an explanatory diagram of call state data included in the on-site getting in and out database of Embodiment 1 of the present invention.

FIG. 4C is an explanatory diagram of on-site getting in and out data included in the on-site getting in and out database of Embodiment 1 of the present invention.

FIG. 5A is an explanatory diagram of virtual traffic demand data included in a simulation database of Embodiment 1 of the present invention.

FIG. 5B is an explanatory diagram of car state data included in the simulation database of Embodiment 1 of the present invention.

FIG. 5C is an explanatory diagram of call state data included in the simulation database of Embodiment 1 of the present invention.

FIG. 15 is an explanatory diagram of parameters of the prediction model included in the model database of Embodiment 1 of the present invention.

DESCRIPTION OF EMBODIMENTS

Hereinafter, embodiments of the present invention will be described in detail with reference to the drawings.

Embodiment 1

Figure 1:
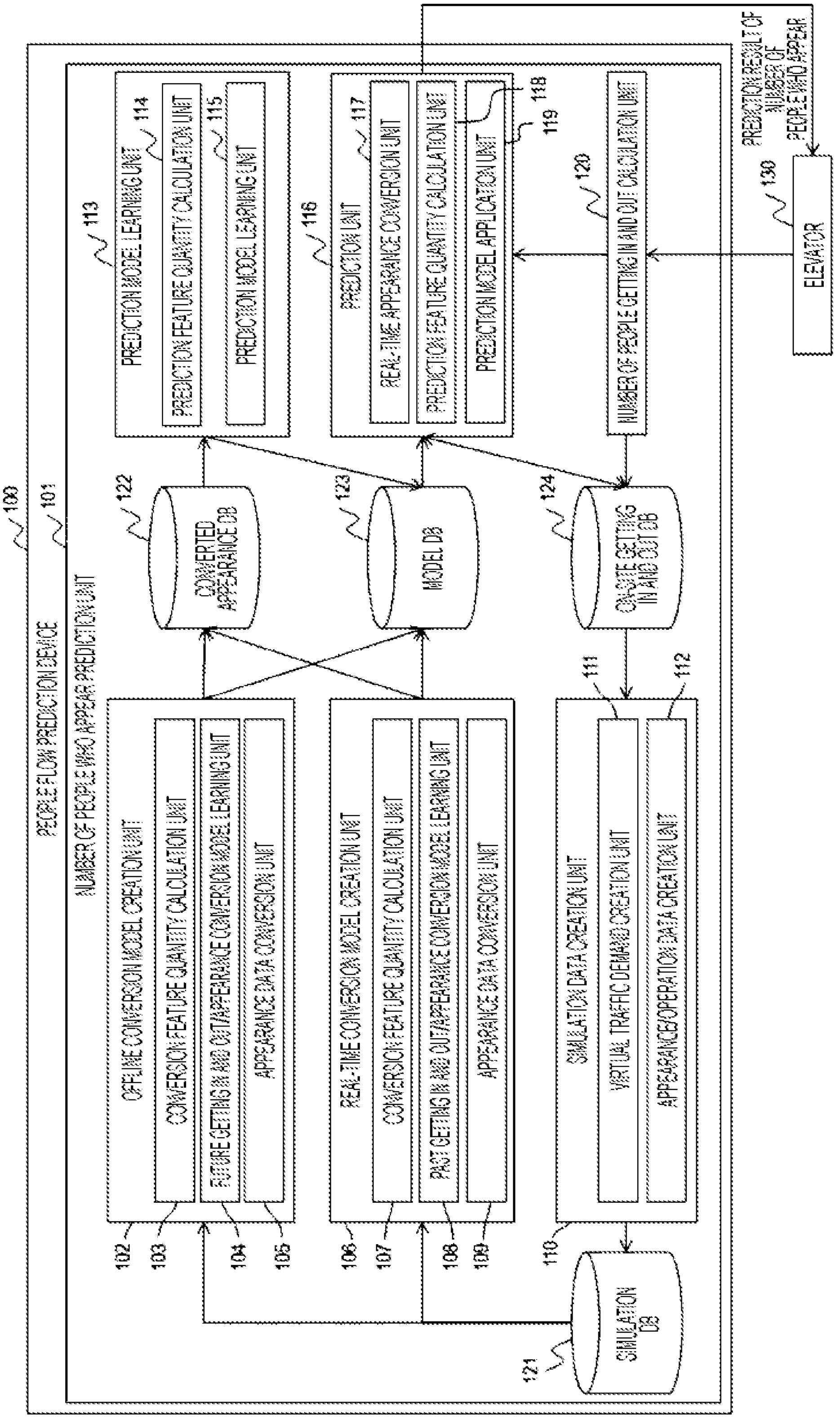
FIG. 1 is a functional block diagram illustrating a configuration of a people flow prediction device according to Embodiment 1 of the present invention.

FIG. 1 is a functional block diagram illustrating a configuration of a people flow prediction device 100 according to Embodiment 1 of the present invention.

The people flow prediction device 100 of the present embodiment has a number of people who appear prediction unit 101.

The number of people who appear prediction unit 101 has an offline conversion model creation unit 102, a real-time conversion model creation unit 106, a simulation data creation unit 110, a prediction model learning unit 113, a prediction unit 116, a number of people getting in and out calculation unit 120, a simulation database (DB) 121, a converted appearance database (DB) 122, a model database (DB) 123, and an on-site getting in and out database (DB) 124.

The offline conversion model creation unit 102 includes a conversion feature quantity calculation unit 103, a future getting in and out/appearance conversion model learning unit 104, and an appearance data conversion unit 105. The real-time conversion model creation unit 106 includes a conversion feature quantity calculation unit 107, a past getting in and out/appearance conversion model learning unit 108, and an appearance data conversion unit 109. The simulation data creation unit 110 includes a virtual traffic demand creation unit 111 and an appearance/operation data creation unit 112. The prediction model learning unit 113 includes a prediction feature quantity calculation unit 114 and a prediction model learning unit 115. The prediction unit 116 includes a real-time appearance conversion unit 117, a prediction feature quantity calculation unit 118, and a prediction model application unit 119.

The process executed by each unit described above and the contents of each database will be described later.

An elevator 130 is, for example, a group-control elevator having a plurality of cars (not illustrated) installed in one building, and has a control unit (not illustrated) that controls operation of the cars. The prediction unit 116 transmits the predicted result of the number of people who appear to the elevator 130, and the control unit of the elevator 130 controls operation of the cars on the basis of the result. In addition, the control unit transmits various pieces of information acquired by the elevator 130 to the people flow prediction device 100. The number of people getting in and out calculation unit 120 executes the process described later on the basis of information acquired from the elevator 130.

Note that in the present embodiment, "appearance" means that a person who is going to use the elevator reaches an elevator hall (that is, an elevator landing), and "number of people who appear" is the number of people who have appeared.

Figure 2:
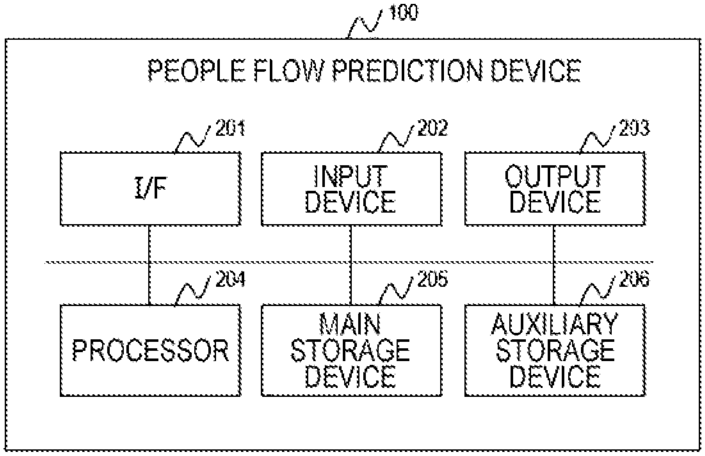
FIG. 2 is a block diagram illustrating a hardware configuration of the people flow prediction device according to Embodiment 1 of the present invention.

FIG. 2 is a block diagram illustrating a hardware configuration of the people flow prediction device 100 according to Embodiment 1 of the present invention.

The people flow prediction device 100 is, for example, a computer having an interface (I/F) 201, an input device 202, an output device 203, a processor 204, a main storage device 205, and an auxiliary storage device 206 connected to one another.

The interface 201 is connected to a network (not illustrated) and communicates with the elevator 130 via the network. The input device 202 is a device used by a user of the people flow prediction device 100 to input information to the people flow prediction device 100, and may include at least one of, for example, a keyboard, a mouse, a touch sensor, and the like. The output device 203 is a device that outputs information to a user of the people flow prediction device 100, and may include, for example, a display device that displays a character and an image or the like.

The processor 204 executes various processes according to programs stored in the main storage device 205. The main storage device 205 is a semiconductor storage device such as a DRAM, and stores the programs executed by the processor 204 and data or the like necessary for processing of the processor. The auxiliary storage device 206 is a relatively large-capacity storage device such as a hard disk drive or a flash memory, and stores data or the like referred to in the processes executed by the processor 204.

In the main storage device 205 of the present embodiment, programs for realizing the number of people who appear prediction unit 101, the offline conversion model creation unit 102, the real-time conversion model creation unit 106, the simulation data creation unit 110, the prediction model learning unit 113, the prediction unit 116, and the number of people getting in and out calculation unit 120 are stored. Therefore, in the following description, the process executed by each unit described above is actually executed by the processor 204 according to the program corresponding to each unit stored in the main storage device 205.

The auxiliary storage device 206 of the present embodiment stores the simulation database 121, the converted appearance database 122, the model database 123, and the on-site getting in and out database 124. Furthermore, a program corresponding to each unit included in the number of people who appear prediction unit 101 may be stored in the auxiliary storage device 206 and may be copied to the main storage device 205 as needed. In addition, at least some of the databases described above may be copied to the main storage device 205 as needed.

Figure 3A:
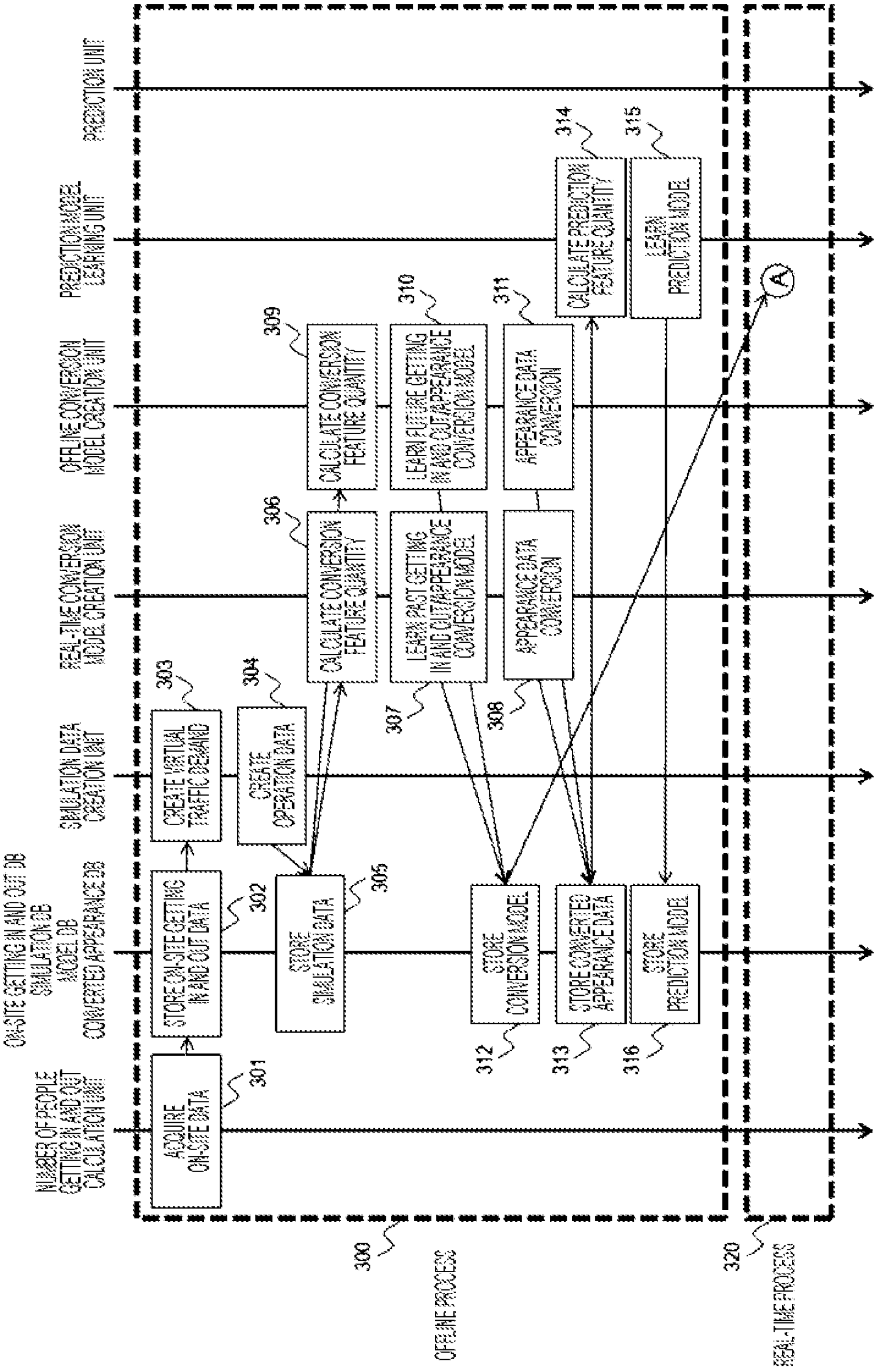
FIG. 3A is a sequence diagram illustrating processes executed by the people flow prediction device according to Embodiment 1 of the present invention.
Figure 3B:
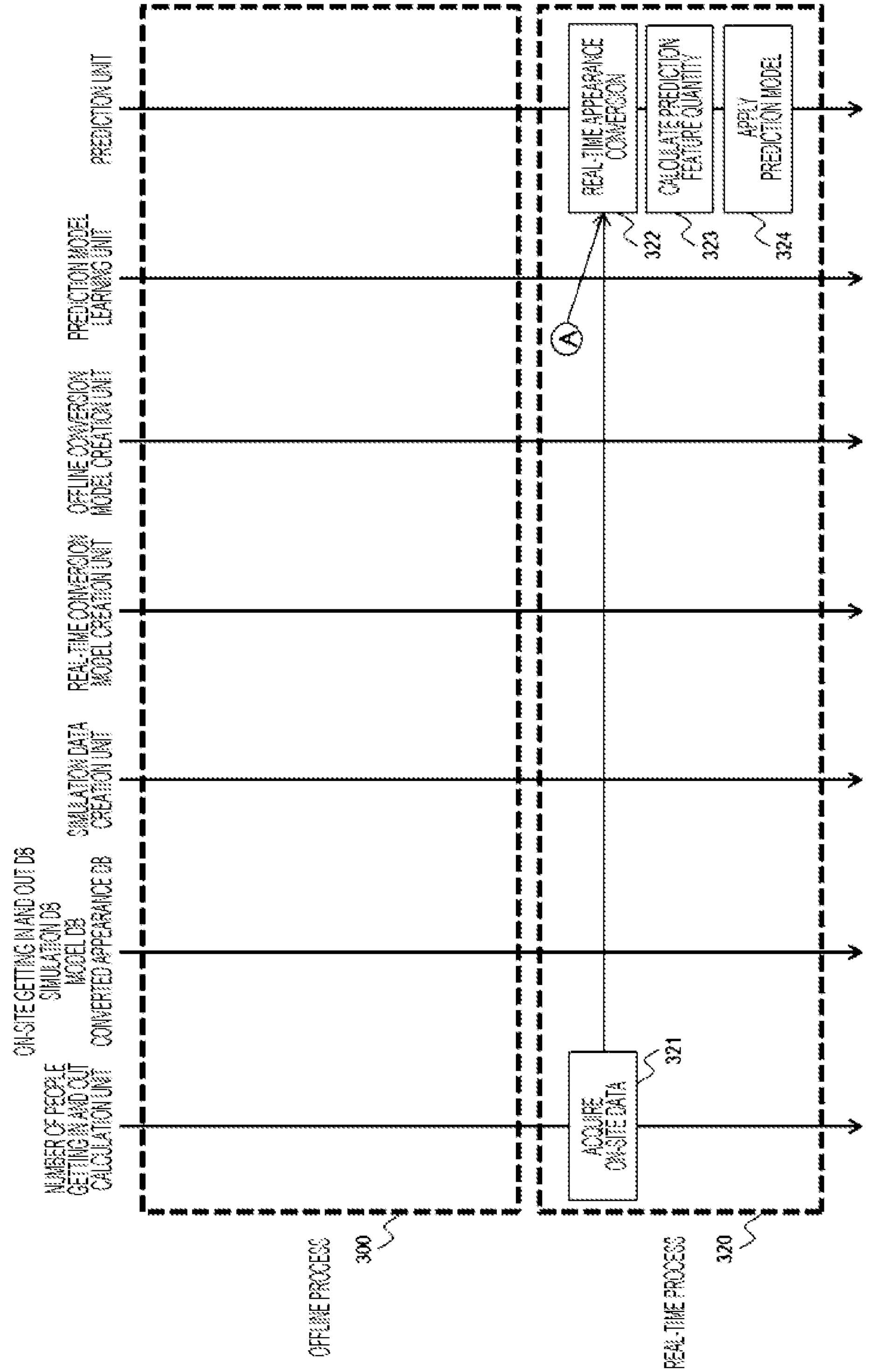
FIG. 3B is a sequence diagram illustrating processes executed by the people flow prediction device according to Embodiment 1 of the present invention.

FIGS. 3A and 3B are sequence diagrams illustrating processes executed by the people flow prediction device 100 according to Embodiment 1 of the present invention.

The processes of the people flow prediction device 100 include an offline process 300 of learning a prediction model for predicting the number of people who will appear in the future from the number of people who have appeared so far on the basis of data acquired by simulation and data acquired during actual operation of the elevator 130 in the past, and a real-time process 320 for predicting the number of people who will appear by using a prediction model obtained by learning. First, the offline process 300 will be described.

First, the number of people getting in and out calculation unit 120 acquires data on the state of the elevator 130 acquired during actual operation in the past from the elevator 130 (step 301). The data acquired here may include, for example, the position of each car of the elevator 130, the moving direction, the weight of the load of each car, and the like for each time point (or a time zone of a predetermined length). Further, the number of people getting in and out calculation unit 120 may acquire data indicating the call state of each floor, that is, whether or not a call button of each floor has been pressed at each time point (or a time zone of a predetermined length). These pieces of data are also referred to as on-site data.

Further, the number of people getting in and out calculation unit 120 creates on-site getting in and out data from the data that has been acquired. For example, the number of people getting in and out calculation unit 120 may estimate the number of people in each car at each time point on the basis of the weight of each car at each time point. In addition, the number of people getting in and out calculation unit 120 may estimate the number of people who got in each car at each floor, the number of people who got off at each floor, or the like from the changes in the position, the moving direction, and the weight of each car at each time point. Further, the number of people getting in and out calculation unit 120 may estimate the number of people who got in at one floor and got out at another floor on the basis of operation records of a destination floor button of each car and the call button of each floor. On-site getting in and out data includes at least one of such pieces of information. Since estimation as described above can be performed by any method, detailed description thereof will be omitted here.

The number of people getting in and out calculation unit 120 stores data of the car state and the like that has been acquired and the on-site getting in and out data estimated on the basis of the data in the on-site getting in and out database 124 (step 302). Examples of the contents of the on-site getting in and out database 124 will be described later (see FIGS. 4A to 4C).

Next, the virtual traffic demand creation unit 111 of the simulation data creation unit 110 creates a virtual traffic demand (step 303). For example, the virtual traffic demand creation unit 111 may use random numbers to determine the time point when a person appears, the floor where the person appears, and the floor (destination floor) where the person is going by using the elevator 130 and may assume that such a person has appeared (that is, may make such a person to virtually appear). The virtual traffic demand creation unit 111 make as many people as are sufficient for creating simulation data to appear according to operation simulation to be described later.

At this time, the virtual traffic demand creation unit 111 may make people appear at random without any restriction, or may make people appear at random after adding a restriction based on the on-site getting in and out data. For example, the virtual traffic demand creation unit 111 may make people appear so that distribution of the probability that a person will appear is the same as that calculated from the on-site getting in and out data. More specifically, for example, the distribution of the number of people on board the elevator 130 for each time zone having an appropriate time width may be modeled by the Poisson distribution from the on-site getting in and out data. Then, people may be made to appear so that distribution of the appearance probability of people follows the modeled Poisson distribution. This enables simulation data to be efficiently created.

Next, the appearance/operation data creation unit 112 of the simulation data creation unit 110 creates operation data of the elevator 130 from the virtual traffic demand (that is, appearance of a person) created in step 303 (step 304). Specifically, the appearance/operation data creation unit 112 has an operation simulator that simulates operation of the elevator 130, and executes operation simulation by inputting the virtual traffic demand created in step 303, that is, information indicating that a person who is going to go to which floor appears the elevator hall on which floor.

Then, the appearance/operation data creation unit 112 creates virtual operation data as a result of operation simulation. The virtual operation data created here may include, for example, data of the virtual number of people getting in and out, such as the number of people in the car at each time point or the number of people getting in and out for each predetermined time zone starting from each time point obtained by simulation, and furthermore, data such as the position of each car obtained by simulation, the moving direction, and the call state on each floor.

The simulation data creation unit 110 stores the virtual traffic demand created by the virtual traffic demand creation unit 111 and the operation data created by the appearance/operation data creation unit 112 in the simulation database 121. Examples of the contents of the simulation database 121 will be described later (see FIGS. 5A to 5C).

Next, the real-time conversion model creation unit 106 creates a model for estimating the number of people who appear after a certain time point on the basis of operation data such as the number of people getting in and out before the certain time point (in other words, for converting the number of people getting in and out before the certain time point into the number of people who appear after the certain time point) (steps 306 to 308). The model created here is described as a past getting in and out/appearance conversion model. Since this model is used not only in the offline process 300 but also in the real-time process 320, this model is also referred to as a real-time conversion model.

Note that in the present embodiment, the number of people getting in and out or the like in a certain time zone is converted into the number of people who appear in a later time zone. Here, the relationship between the time zone of operation data that is the basis of conversion and the time zone of the number of people who appear converted on the basis of the operation data is such that if the former time zone includes a time zone before the latter time zone, at least portions of the both time zones may overlap with each other. For example, in a case where the latter time zone is a time zone of a predetermined length whose end point is a certain time point, the former time zone may be a time zone which ends at the start point of the latter time zone or any time point before the start point, or may be a time zone which ends at any time point included in the latter time zone and starts at any time point before the start point of the latter time zone.

Hereinafter, the process of the real-time conversion model creation unit 106 will be described. First, the conversion feature quantity calculation unit 107 of the real-time conversion model creation unit 106 calculates the feature quantity of the operation data for each time zone created according to simulation by the simulation data creation unit 110 (step 306). Next, the past getting in and out/appearance conversion model learning unit 108 of the real-time conversion model creation unit 106 performs machine learning by using as learning data the combination of the feature quantity of each time zone calculated in step 306 and the number of people who appear in the time zone after each time zone (that is, virtual traffic demand input to the operation simulator) to create the past getting in and out/appearance conversion model (step 307). The past getting in and out/appearance conversion model that has been created is stored in the model database 123 (step 312).

Next, the appearance data conversion unit 109 of the real-time conversion model creation unit 106 applies the past getting in and out/appearance conversion model to operation data acquired as the on-site data to create the number of people who appear in the time zone corresponding to the operation data (step 308). For example, by applying the past getting in and out/appearance conversion model to operation data in a plurality of consecutive time zones and creating the number of people who appear in a time zone corresponding to those time zones, a set of operation data in a certain period in the period obtained by combining the plurality of consecutive time zones and the number of people who appear in the same period can be acquired. The number of people who appear thus obtained is stored in the converted appearance database 122 (step 313).

Examples of the process of the real-time conversion model creation unit 106 and the data created as a result will be described later (see FIGS. 6 to 9).

In contrast, the offline conversion model creation unit 102 creates a model for estimating the number of people who appear before a certain time point on the basis of operation data such as the number of people getting in and out after the certain time point (in other words, for converting the number of people getting in and out after the certain time point into the number of people who appear before the certain time point) (steps 309 to 311). The model created here is described as a future getting in and out/appearance conversion model. Since this model is used in the offline process 300, the model is also referred to as an offline conversion model.

Note that in the present embodiment, the number of people getting in and out or the like in a certain time zone is converted into the number of people who appear in a prior time zone. Here, the relationship between the time zone of operation data that is the basis of conversion and the time zone of the number of people who appear converted on the basis of the operation data is such that if the former time zone includes a time zone after the latter time zone, at least portions of the both time zones may overlap with each other. For example, in a case where the latter time zone is a time zone of a predetermined length which starts at a certain time point, the former time zone may be a time zone which starts at the end point of the latter time zone or any time point after the start point, or may be a time zone which starts at any time point included in the latter time zone and ends at any time point after the end point of the latter time zone.

Hereinafter, the process of the offline conversion model creation unit 102 will be described. First, the conversion feature quantity calculation unit 103 of the offline conversion model creation unit 102 calculates the feature quantity of the operation data for each time zone, created according to simulation by the simulation data creation unit 110 (step 309). Next, the future getting in and out/appearance conversion model learning unit 104 of the offline conversion model creation unit 102 performs machine learning by using as learning data the combination of the feature quantity of each time zone calculated in step 309 and the number of people who appear in a time zone before each time zone (that is, a virtual traffic demand input to the operation simulator) to create the future getting in and out/appearance conversion model (step 310). The future getting in and out/appearance conversion model that has been created is stored in the model database 123 (step 312).

Next, the appearance data conversion unit 105 of the offline conversion model creation unit 102 applies the future getting in and out/appearance conversion model to the operation data acquired as the on-site data to create the number of people who appear in the time zone corresponding to the operation data (step 311). For example, by applying the future getting in and out/appearance conversion model to operation data in a plurality of consecutive time zones and creating the number of people who appear in a time zone corresponding to those time zones, a set of operation data in a certain period in the period obtained by combining the plurality of consecutive time zones and the number of people who appear in the same period can be acquired. The number of people who appear thus obtained is stored in the converted appearance database 122 (step 313).

Examples of the process of the offline conversion model creation unit 102 and the data created as a result will be described later (see FIGS. 10 to 13).

Note that one of the process of the real-time conversion model creation unit 106 (steps 306 to 308) and the process of the offline conversion model creation unit 102 (steps 309 to 311) may be executed first or both of them may be executed in parallel.

Next, the prediction model learning unit 113 learns a prediction model for predicting the number of people who appear after a certain time point from the number of people who appear before the certain time point (steps 314 to 315). Specifically, first, the prediction feature quantity calculation unit 114 of the prediction model learning unit 113 calculates the feature quantity of the number of people who appear for each time zone from the number of people who appear converted by the appearance data conversion unit 109 (step 314).

Next, the prediction model learning unit 115 of the prediction model learning unit 113 learns a prediction model for predicting the number of people who appear in a time zone after a certain time zone from the number of people who appear in the certain time zone, on the basis of the feature quantity of the number of people who appear in each time zone calculated in step 314 and the number of people who appear in the time zone after each time zone converted by the appearance data conversion unit 105 (step 315). The prediction model obtained by learning is stored in the model database 123 (step 316).

Figure 14A:
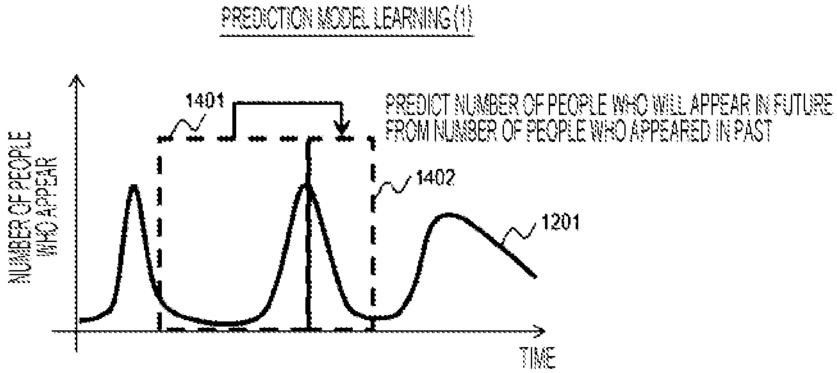
FIG. 14A is an explanatory diagram of a process in which a prediction model learning unit of Embodiment 1 of the present invention learns a prediction model.

Details of learning executed by the prediction model learning unit 113 and examples of the prediction model stored will be described later (FIGS. 14A to 15).

Then, the offline process 300 ends. Next, the real-time process 320 will be described. In the real-time process 320, the prediction unit 116 predicts the number of people who appear after a certain time point from the on-site getting in and out data before the certain time point by using the past getting in and out/appearance conversion model and the prediction model. The specific procedures are as follows.

First, the number of people getting in and out calculation unit 120 acquires data on the state of the elevator 130 acquired during actual operation in the past from the elevator 130 (step 321). For example, in a case of trying to predict the number of people who will appear in a certain time zone after the current time point (referred to as the time zone to be predicted here), the time zone of the number of people who appeared in the past required to predict the number of people who appear in the time zone to be predicted (here, referred to as the time zone of the number of people who appeared which is the basis of prediction) may be specified by using the prediction model created by the prediction model learning unit 113, the time zone of the data in the state of the elevator 130 required to acquire the number of people who appear in the time zone of the number of people who appeared which is the basis of prediction may be specified by using the past getting in and out/appearance conversion model, and data on the state of the elevator 130 in the time zone that has been finally specified may be acquired.

Next, the real-time appearance conversion unit 117 of the prediction unit 116 calculates the conversion feature quantity from the data acquired in step 321 and applies the past getting in and out/appearance conversion model to the calculated conversion feature quantity to acquire the number of people who appear (step 322).

Next, the prediction feature quantity calculation unit 118 of the prediction unit 116 calculates the feature quantity of the number of people who appear acquired in step 322 (step 323). Next, the prediction model application unit 119 of the prediction unit 116 predicts the number of people who appear in the time zone to be predicted by applying the prediction model to the feature quantity calculated in step 323.

The prediction unit 116 transmits the number of people who appear predicted in this manner to the elevator 130. The elevator 130 can contribute to improvement of user satisfaction by controlling the operation on the basis of the predicted number of people who appear to reduce, for example, the waiting time.

Hereinafter, details of the offline process 300 will be described with reference to FIGS. 4A to 15, and details of the real-time process 320 will be described with reference to FIG. 16.

First, examples of the contents of the on-site getting in and out database 124 will be described with reference to FIGS. 4A to 4C.

FIG. 4A is an explanatory diagram of car state data 400 included in the on-site getting in and out database 124 of Embodiment 1 of the present invention.

The car state data 400 is data acquired from the elevator 130 by the number of people getting in and out calculation unit 120 and stored in the on-site getting in and out database 124 (steps 301 and 302), and includes information on the car state in the past in the actual operation of the elevator 130. For example, the car state data 400 includes a plurality of records, and each record includes a time and date 401, a car number 402, a floor 403, a weight 404, and one or more car parameters (for example, car parameter 1_405).

The time and date 401 represents the time and date when data of each record was acquired. The car number 402 identifies the car of the elevator 130 from which data of each record was acquired. The floor 403 indicates the location of the car identified by the car number 402 at the time point specified by the time and date 401.

The weight 404 represents the weight of the load of the car identified by the car number 402 at the time point specified by the time and date 401. This is a value obtained from a weight sensor installed in the elevator 130 to measure the weight of the load in each car, and may be the weight itself or the number of people in the car estimated from the weight (also referred to as the number of people on board).

The car parameter is a parameter indicating the state of each car state than the items described above. For example, the car parameter may include the traveling direction of each car (for example, up or down), the state of the destination floor button installed in the car (for example, which floor button is pressed), or the like.

FIG. 4B is an explanatory diagram of call state data 410 included in the on-site getting in and out database 124 of Embodiment 1 of the present invention.

The call state data 410 is data acquired from the elevator 130 by the number of people getting in and out calculation unit 120 and stored in the on-site getting in and out database 124 (steps 301 and 302), and includes information on car call performed by the user in the past actual operation of the elevator 130. For example, the call state data 410 includes a plurality of records, and each record includes time and date 411, a floor 412, UP call 413, DN call 414, and one or more call parameters (for example, call parameter 1_415).

The time and date 411 represents the time and date when data of each record was acquired. The floor 412 represents the floor corresponding to each record. The UP call 413 indicates whether or not a car moving up is called at the floor specified by the floor 412 at the time point specified by the time and date 411. For example, the value "1" of the UP call 413 indicates that a car moving up is called (that is, an up call button in the elevator hall on the floor by the floor 412 was pressed). The DN call 414 indicates whether or not a car moving down is called at the floor specified by the floor 412 at the time point specified by the time and date 411.

The call parameter is a parameter related to a call other than the calls described above. For example, the call parameter may be information that identifies the algorithm for allocating a car to the call.

FIG. 4C is an explanatory diagram of on-site getting in and out data 420 included in the on-site getting in and out database 124 of Embodiment 1 of the present invention.

The on-site getting in and out data 420 is data estimated by the number of people getting in and out calculation unit 120 on the basis of the car state data 400 and the call state data 410 and stored in the on-site getting in and out database 124 (steps 301 and 302), and includes information on the usage status of the elevator 130. Specifically, the on-site getting in and out data 420 includes a plurality of records, and each record includes the number of people 424 which is the estimated value of the number of people who used the elevator from the floor indicated by a departure floor 422 to the floor indicated by a destination floor 423 at the time and date indicated by time and date 421.

For example, the first record of the on-site getting in and out data 420 illustrated in FIG. 4C indicates that the number of people who have moved from the 1st floor to the 5th floor in a predetermined time (for example, 1 minute) starting from 7:00:00 on Jan. 1, 2018 by using the elevator 130 was estimated to be five.

Next, examples of the contents of the simulation database 121 will be described with reference to FIGS. 5A to 5C.

FIG. 5A is an explanatory diagram of virtual traffic demand data 500 included in the simulation database 121 of Embodiment 1 of the present invention.

The virtual traffic demand data 500 is data created by the virtual traffic demand creation unit 111 of the simulation data creation unit 110 and stored in the simulation database 121 (steps 303, 305). Specifically, the virtual traffic demand data 500 includes a plurality of records, and each record includes time and date 501, a departure floor 502, and a destination floor 503. One record corresponds to one person who is assumed to appear in an elevator hall on any floor at any time point.

The time and date 501 represents the time and date when a person appeared, the departure floor 502 represents the floor where the person appeared, and the destination floor 503 represents the floor where the person is going. Note that the value of the time and date 501 is the time and date in the operation simulation described later, and does not necessarily mean the actual time and date.

For example, the first record in FIG. 5A indicates that a person going to the 5th floor is assumed to appear in the elevator hall on the 1st floor and at a predetermined time (for example, 1 minute) starting from 7:00:00 on Jan. 1, 2018. When such information (for example, virtual traffic demand) is entered into the operation simulator, simulations of how the elevator 130 car is called, how the elevator 130 operates over time, and the state of each car at each time point are made.

FIG. 5B is an explanatory diagram of car state data 510 included in the simulation database 121 of Embodiment 1 of the present invention.

The car state data 510 is data created on the basis of the result of a simulation executed by the operation simulator included in the appearance/operation data creation unit 112 on the basis of the virtual traffic demand data 500, and stored in the simulation database 121 (steps 304, 305).

Specifically, each record of the car state data 510 includes a time and date 511, a car number 512, a floor 513, a weight 514, and one or more car parameters (for example, car parameter 1_515). Since these items are similar to the time and date 401, the car number 402, the floor 403, the weight 404, and the car parameter 1_405 of the car state data 400 illustrated in FIG. 4A, the description thereof will be omitted. However, while a value obtained by the actual operation is stored in each item of the car state data 400, a value obtained by the operation simulation is stored in the car state data 510. In addition, the time and date 511 corresponds to the time and date 501 of the virtual traffic demand data 500, and does not necessarily mean the actual time and date. However, in a case where the virtual traffic demand data is calculated on the basis of the distribution of the on-site getting in and out data, time and date of the on-site getting in and out data (for example, the value of the time and date 401 in FIG. 4A) which is the basis for calculation is stored in the time and date 501.

FIG. 5C is an explanatory diagram of call state data 520 included in the simulation database 121 of Embodiment 1 of the present invention.

The call state data 520 is data created on the basis of the result of a simulation executed by the operation simulator included in the appearance/operation data creation unit 112 on the basis of the virtual traffic demand data 500, and stored in the simulation database 121 (steps 304, 305).

For example, each record of the call state data 520 includes time and date 521, a floor 522, UP call 523, DN call 524, and one or more call parameters (for example, call parameter 1_525). Since these items are similar to the time and date 411, the floor 412, the UP call 413, the DN call 414, the call parameter 1_415, and the like of the call state data 410 illustrated in FIG. 4B, the description thereof will be omitted. However, while a value obtained by the actual operation is stored in each item of the call state data 410, a value obtained by the operation simulation is stored in the call state data 520. In addition, the time and date 521 corresponds to the time and date 501 of the virtual traffic demand data 500, and does not necessarily mean the actual time and date.

Next, details of the process (steps 306 to 308) of the real-time conversion model creation unit 106 will be described.

Figures 6, 7:
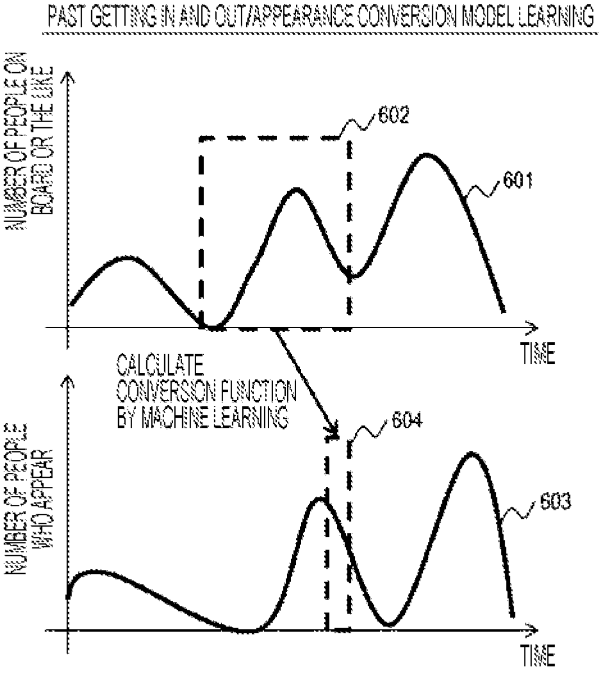
FIG. 6 is an explanatory diagram of a process in which a real-time conversion model creation unit of Embodiment 1 of the present invention creates a past getting in and out/appearance conversion model.
FIG. 7 is an explanatory diagram of parameters of the past getting in and out/appearance conversion model included in a model database of Embodiment 1 of the present invention.

FIG. 6 is an explanatory diagram of a process (steps 306 to 307) in which the real-time conversion model creation unit 106 of Embodiment 1 of the present invention creates the past getting in and out/appearance conversion model.

The number 603 of people who appear represents the number of people who appear in each time in a certain period (for example, a certain day), created by the virtual traffic demand creation unit 111. Since the actual number of people who appear includes the number of people who appear on each floor, the actual number of people who appear is expressed as a vector value. However, here, for the sake of explanation, the actual number of people who appear is expressed as a scalar value.

In contrast, the number 601 of people on board or the like represents the number of people on board or the like in each time included in the operation data in the same period (for example, the same day) as the period described above, created according to operation simulation performed by the appearance/operation data creation unit 112 on the basis of the number 603 of people who appear. Similarly to the number of people who appear, the number of people on board or the like is actually expressed as a vector value. However, here, for the sake of explanation, the number of people on board is expressed as a scalar value. In addition to the number of people on board obtained by simulation (that is, the number of people on board estimated from the weight 514), the number 601 on board or the like may include at least one of the location of each car, the moving direction, a car parameter, call information on each floor, and the like.

The past getting in and out/appearance conversion model learning unit 108 extracts a combination of the feature quantity of the number 601 of people on board or the like in a certain time zone 602 and the number 603 of people who appear in the time zone 604 after the certain time zone 602. The feature quantity of the number 601 of people on board or the like is calculated by the conversion feature quantity calculation unit 107 (step 306).

The past getting in and out/appearance conversion model learning unit 108 extracts and machine-learns a large number of combinations of the feature quantities of the numbers 601 of people on board or the like and the numbers 603 of people who appear in time zones having correspondence similar to that as described above to calculate a function (past getting in and out/appearance conversion model, that is, a real-time conversion model) for converting the number 601 of people on board or the like in the past into the number 603 of people who appear after that (step 307). The parameters of the conversion model calculated in this manner are stored in the model database 123 (step 312).

FIG. 6 illustrates, for example, the number of people on board or the like and the number of people who appear in a day. However, in reality, the number of people on board and the number of people who appear in a longer period, that is, a period sufficient to learn an accurate past getting in and out/appearance conversion model are used.

FIG. 7 is an explanatory diagram of parameters 700 of past getting in and out/appearance conversion model included in the model database 123 of Embodiment 1 of the present invention.

The parameters 700 of the past getting in and out/appearance conversion model include a plurality of records, each record has date 701 and a plurality of model parameters (for example, a model parameter 1_702 and a model parameter 2_703).

The date 701 represents the date of the simulation data which is the basis for creating the past getting in and out/appearance conversion model. The model parameter 1_702, the model parameter 2_703, and the like are parameters of the past getting in and out/appearance conversion model calculated by machine learning performed by the past getting in and out/appearance conversion model learning unit 108.

Note that as has already been explained, in a case where a virtual traffic demand is created according to the distribution of the appearance probability calculated from the on-site getting in and out data on any day and operation simulation is performed on the basis of the distribution, the date indicated by the time and date 421 of the on-site getting in and out data may be stored as the date 701. In that case, the parameter of the past getting in and out/appearance conversion model created from the result of the operation simulation based on the virtual traffic demand is stored in the model parameter 1_702 or the like of the record including the date.

In contrast, in a case where a virtual traffic demand is created without restrictions based on the on-site getting in and out data and the past getting in and out data/appearance conversion model is created from the simulation result on the basis of the virtual traffic demand, the date 701 corresponding to the past getting in and out/appearance conversion model may be blank.

Figures 8, 9:
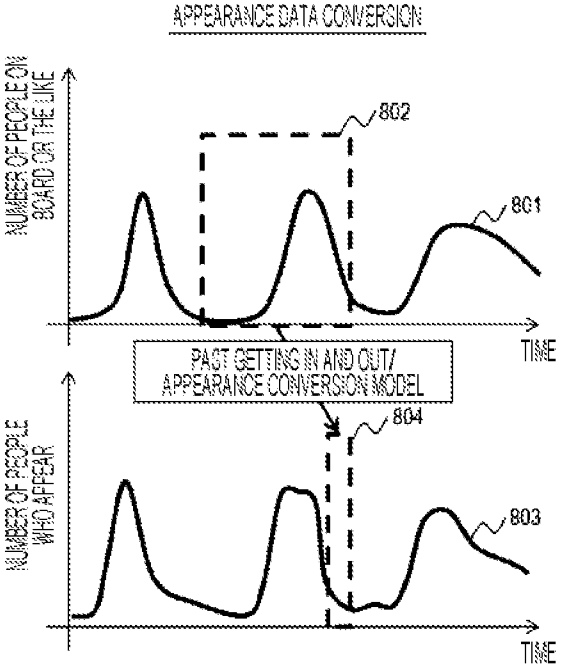
FIG. 8 is an explanatory diagram of a process in which the real-time conversion model creation unit of Embodiment 1 of the present invention converts the actual number of people on board or the like by using the past getting in and out/appearance conversion model.
FIG. 9 is an explanatory diagram of data of the number of people who appear created by the real-time conversion model creation unit included in a converted appearance database of Embodiment 1 of the present invention.

FIG. 8 is an explanatory diagram of a process (step 308) in which the real-time conversion model creation unit 106 of Embodiment 1 of the present invention converts the actual number of people on board or the like into the number of people who appear by using the past getting in and out/appearance conversion model.

The number 801 of people on board or the like represents the value of the number of people on board or the like in each time in a certain period (for example, a certain day) in the operation data acquired by the number of people getting in and out calculation unit 120 and stored in the on-site getting in and out database.

The appearance data conversion unit 109 of the real-time conversion model creation unit 106 calculates the feature quantity of the number 801 of people on board or the like in a time zone 802, and applies the past getting in and out/appearance conversion model into the feature quantity to acquire the number of people who appear in a time zone 804 after the time zone 802. By executing the above process for each time zone, the number 803 of people who appear in the period same as the above period (for example, the same day) can be acquired.

Note that, even though FIG. 8 illustrates the number 801 people on board or the like and the number 803 of people who appear, for example, in one day, in reality, the past getting in and out/appearance conversion model may be applied to the number of people on board or the like in a longer period to acquire the number of people who appear in a period corresponding to the longer period, and may acquire the number 801 of people on board or the like and the number 803 of people who appear in a period of any length, such as a desired day or a desired time zone, from the number of people on board or the like and the number of people who appear in the longer period.

FIG. 9 is an explanatory diagram of data of the number of people who appear created by the real-time conversion model creation unit 106 included in the converted appearance database 122 of Embodiment 1 of the present invention.

Specifically, FIG. 9 illustrates an example of data created by the real-time conversion model creation unit 106 applying the past getting in and out/appearance conversion model that has been created to the actual operation data in step 308 and stored in the converted appearance database 122 in step 312. That is, FIG. 9 corresponds to part of the number 803 of people who appear illustrated in FIG. 8.

Each record of data 900 illustrated in FIG. 9 includes time and date 901, a departure floor 902, a destination floor 903, and the number of people 904. Since these items are similar to the time and date 421, the departure floor 422, the destination floor 423, and the number of people 424 of the on-site getting in and out data 420 in FIG. 4C, the description thereof will be omitted. However, since values each representing the number of people who appear converted on the basis of the past getting in and out/appearance conversion model that has been created are stored in the respective records in FIG. 9, the values differ from the values stored in the on-site getting in and out data 420 in FIG. 4C. In addition, the destination floor 903 may be estimated in a manner similar to the manner of estimating the destination floor 423. However, such estimation may be omitted to create data 900 that does not include the destination floor 903.

Next, details of the process (steps 309 to 311) of the offline conversion model creation unit 102 will be described.

Figures 10, 11:
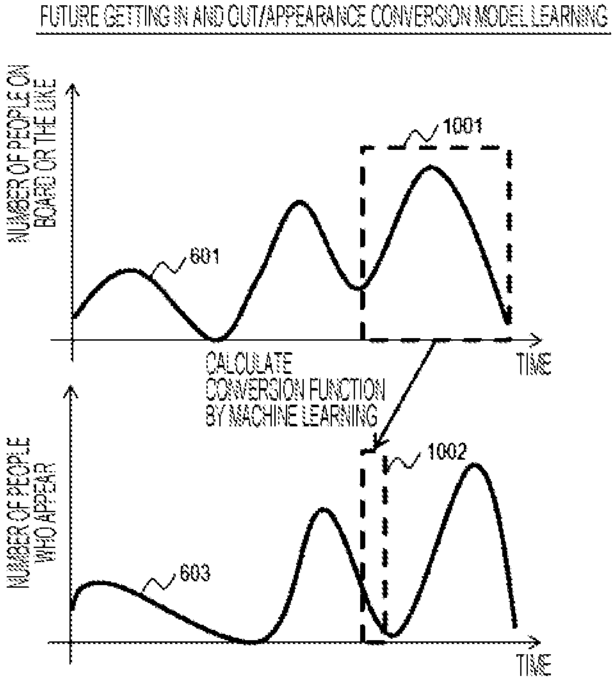
FIG. 10 is an explanatory diagram of a process in which an offline conversion model creation unit of Embodiment 1 of the present invention creates a future getting in and out/appearance conversion model.
FIG. 11 is an explanatory diagram of parameters of the future getting in and out/appearance conversion model included in the model database of Embodiment 1 of the present invention.

FIG. 10 is an explanatory diagram of a process (steps 309 to 310) in which the offline conversion model creation unit 102 of Embodiment 1 of the present invention creates the future getting in and out/appearance conversion model.

The number 601 of people on board or the like and the number 603 of people who appear are similar to those illustrated in FIG. 6.

The future getting in and out/appearance conversion model learning unit 104 extracts a combination of the feature quantity of the number 601 of people on board or the like in a certain time zone 1001 and the number 603 of people who appear in a time zone 1002 before the certain time zone 1001. The feature quantity of the number 601 of people on board or the like is calculated by the conversion feature quantity calculation unit 103 (step 309).

The future getting in and out/appearance conversion model learning unit 108 extracts and machine-learns a large number of combinations of the feature quantities of the people 601 on board or the like and the numbers 603 of people who appear in time zones having correspondence similar to that as described above to calculate a function (future getting in and out/appearance conversion model, that is, an offline conversion model) for converting the number 601 of people on board or the like in the past into the number 603 of people who appear before the that (step 310). The parameters of the conversion model calculated in this manner are stored in the model database 123 (step 312)

Note that similarly to the case of FIG. 6, in reality, the number of people on board and the number of people who appear in a sufficient period for learning an accurate future getting in and out/appearance conversion model are used.

FIG. 11 is an explanatory diagram of parameters 1100 of the future getting in and out/appearance conversion model included in the model database 123 of Embodiment 1 of the present invention.

The parameters 1100 of the future getting in and out/appearance conversion model include a plurality of records, each record has date 1101 and a plurality of model parameters (for example, a model parameter 1_1102 and a model parameter 2_1103).

The date 1101 represents the date of the simulation data which is the basis for creating the future getting in and out/appearance conversion model. The model parameter 1_1102, the model parameter 2_1103, and the like are parameters of the future getting in and out/appearance conversion model calculated by machine learning performed by the future getting in and out/appearance conversion model learning unit 104.

Note that the description of the relationship between the date 701 in FIG. 7 and the on-site getting in and out data is also applied to the relationship between the date 1101 in FIG. 11 and the on-site getting in and out data. For example, in a case where a virtual traffic demand is created without restrictions based on the on-site getting in and out data and the past getting in and out data/appearance conversion model is created from the simulation result on the basis of the virtual traffic demand, the date 1101 corresponding to the past getting in and out/appearance conversion model may be blank.

Figures 12, 13:
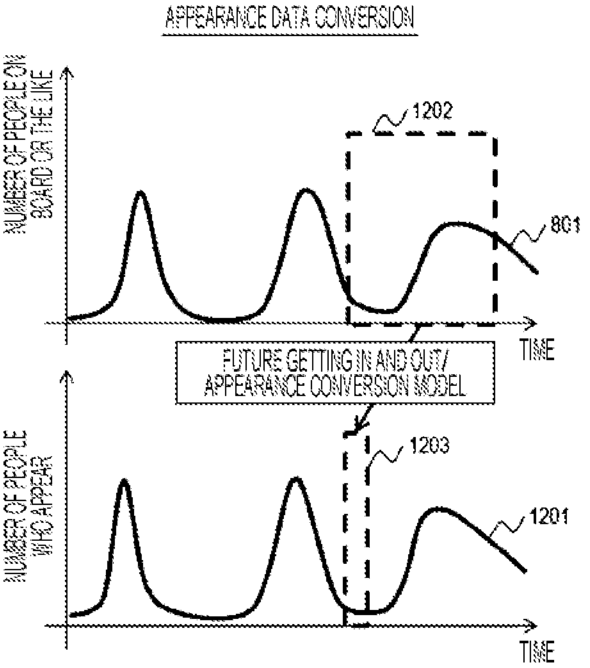
FIG. 12 is an explanatory diagram of a process in which the offline conversion model creation unit of Embodiment 1 of the present invention converts the actual number of people on board or the like into the number of people who appear by using the future getting in and out/appearance conversion model.
FIG. 13 is an explanatory diagram of data of the number of people who appear created by the offline conversion model creation unit included in the converted appearance database of Embodiment 1 of the present invention.

FIG. 12 is an explanatory diagram of a process (step 311) in which the offline conversion model creation unit 102 of Embodiment 1 of the present invention converts the actual number of people on board or the like into the number of people who appear by using the future getting in and out/appearance conversion model.

The number 801 of people on board or the like is similar to that in FIG. 8.

The appearance data conversion unit 105 of the offline conversion model creation unit 102 calculates the feature quantity of the number 801 of people on board or the like in a time zone 1202, and applies the future getting in and out/appearance conversion model into the feature quantity to acquire the number of people who appear in a time zone 1203 before the time zone 1202. By executing the above process for each time zone, the number 1201 of people who appear in the same period (for example, the same day) as the above period in which the number 801 of people on board or the like is obtained can be acquired.

Note that, similarly to the case of FIG. 8, the future getting in and out/appearance conversion model may be applied to the number people on board or the like in a longer period to acquire the number of people who appear in the period corresponding to the longer period, and may acquire the number 801 of people on board or the like and the number 1201 of people who appear in a period of any length, such as a desired day or a desired time zone, from the number of people on board or the like and the number of people who appear in the longer period.

FIG. 13 is an explanatory diagram of data of the number of people who appear created by the offline conversion model creation unit 102 included in the converted appearance database 122 of Embodiment 1 of the present invention.

Specifically, FIG. 13 illustrates an example of data created by the offline conversion model creation unit 102 applying the future getting in and out/appearance conversion model that has been created to the actual operation data in step 311 and stored in the converted appearance database 122 in step 312. That is, FIG. 13 corresponds to part of the number 1201 of people who appear illustrated in FIG. 12.

Each record of data 1300 illustrated in FIG. 13 includes time and date 1301, a departure floor 1302, a destination floor 1303, and the number of people 1304. Since these items are similar to the time and date 421, the departure floor 422, the destination floor 423, and the number of people 424 of the on-site getting in and out data 420 in FIG. 4C, the description thereof will be omitted. However, since values each representing the number of people who appear converted on the basis of the future getting in and out/appearance conversion model that has been created are stored in the respective records in FIG. 13, the values differ from both the values stored in the on-site getting in and out data 420 in FIG. 4C and the values stored in the data 900 in FIG. 9. In addition, the destination floor 1303 may be estimated in a manner similar to the manner of estimating the destination floor 423. However, such estimation may be omitted to create data 1300 that does not include the destination floor 1303.

Next, the details of the process (steps 314 to 315) of the prediction model learning unit 113 will be described.

Figure 14B:
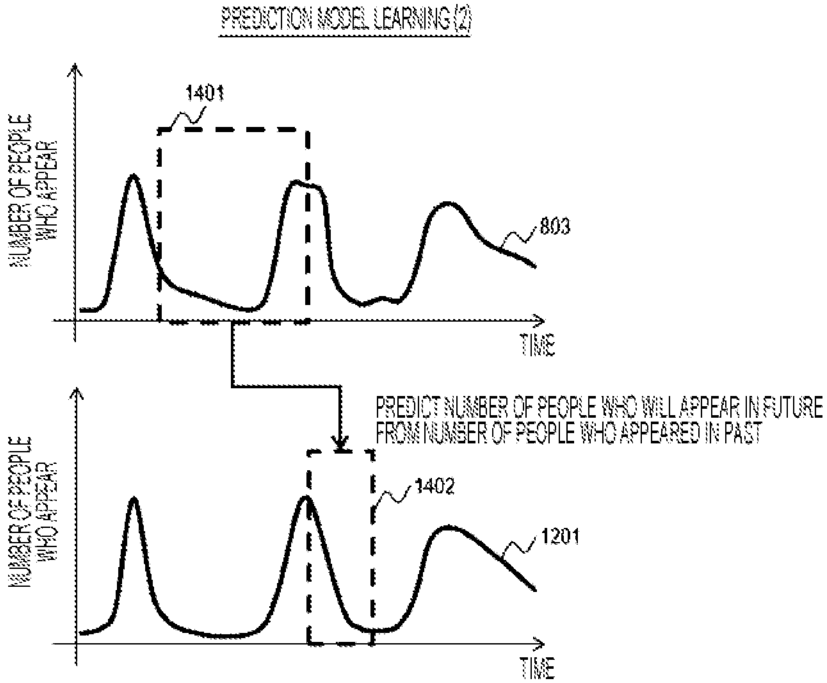
FIG. 14B is an explanatory diagram of a process in which the prediction model learning unit of Embodiment 1 of the present invention learns a prediction model.

FIGS. 14A and 14B are explanatory diagrams of processes in which the prediction model learning unit 113 of Embodiment 1 of the present invention learns a prediction model.

In the first example illustrated in FIG. 14A, the prediction feature quantity calculation unit 114 of the prediction model learning unit 113 calculates the feature quantity of the number 1201 of people who appear in a time zone 1401 (step 314). The prediction model learning unit 115 learns a prediction model for predicting the number 1201 of people who appear in a time zone 1402 after the time zone 1401 from the feature quantity that has been calculated (step 315).

In contrast, in the second example illustrated in FIG. 14B, the prediction feature quantity calculation unit 114 calculates the feature quantity of the number 803 of people who appear in the time zone 1401 (step 314). The prediction model learning unit 115 learns a prediction model for predicting the number 1201 of people who appear in the time zone 1402 after the time zone 1401 from the feature quantity that has been calculated (step 315).

Note that in any of the above examples, the time zones 1401 and 1402 are examples, and the prediction model learning unit 113 can learn a prediction model on the basis of the number of people who appear in a large number of combinations of time zones having the similar relationship.

The prediction model learning unit 113 may adopt any of the methods described above as examples.

Considering the order in which a person appears in the elevator hall and then the person gets in the car, there is a causal relationship between the number of people in a certain time zone and the number of people on board or the like in a time zone slightly later than the certain time zone. From this, it is considered that accuracy of the future getting in and out/appearance conversion model is higher than accuracy of the past getting in and out/appearance conversion model.

However, as will be described later, when the number of people who will appear in the future is to be predicted in the real-time process, the actual number of people on board or the like in the past can be used; however, the actual number of people on board or the like in the future cannot be used. Therefore, it is considered that a robust prediction model suitable for the actual real-time process can be created by creating a prediction model for predicting the number 1201 of people who appear from the number 803 of people who appear obtained by using the past getting in and out/appearance conversion model.

FIG. 15 is an explanatory diagram of parameters 1500 of a prediction model included in the model database 123 of Embodiment 1 of the present invention.

The parameters 1500 of the prediction model include a plurality of records, each record has date 1501 and a plurality of model parameters (for example, a model parameter 1_1502 and a model parameter 2_1503).

The date 1501 represents the date on which the number of people on board or the like (for example, the number 801 of people on board or the like in FIG. 8) that was the basis of the number of people who appear used to create the prediction model (for example, the numbers 803 and 1201 who appear in FIG. 14B) was acquired. The model parameter 1_1502, the model parameter 2_1503, and the like are parameters of the prediction model calculated by machine learning performed by the prediction model learning unit 115.

Figure 16:
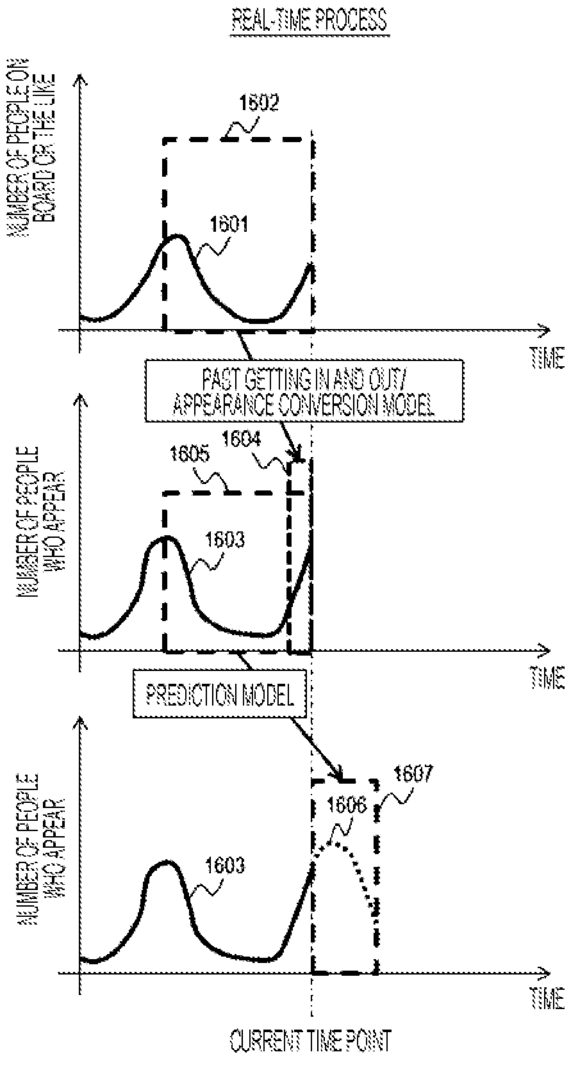
FIG. 16 is an explanatory diagram of a real-time process executed by the number of people getting in and out calculation unit and the prediction unit according to Embodiment 1 of the present invention.

FIG. 16 is an explanatory diagram of the real-time process (steps 321 to 324) executed by the number of people getting in and out calculation unit 120 and the prediction unit 116 according to Embodiment 1 of the present invention.

The number of people getting in and out calculation unit 120 acquires the number 1601 of people on board or the like up to the current time point (step 321). The real-time appearance conversion unit 117 of the prediction unit 116 calculates the feature quantity of the number 1601 of people on board or the like in a time zone 1602 before the current time point, and applies the past getting in and out/appearance conversion model to the feature quantity to acquire the number of people who appear in a time zone 1604 before the current time point. By performing a similar process for each time zone before the current time point, the number 1603 of people who appear before the current time point is acquired (step 322).

Next, the prediction feature quantity calculation unit 118 of the prediction unit 116 calculates the feature quantity of the number 1603 of people who appear in a time zone 1605 before the current time point (step 323). Next, the prediction model application unit 119 of the prediction unit 116 predicts the number 1606 of people who will appear in a time zone 1607 after the current time point by applying the prediction model to the feature quantity calculated in step 323 (step 324). This prediction result is transmitted to the elevator 130.

Note that in the present embodiment, the number of people getting in and out calculation unit 120 acquires not only the number of people on board the elevator 130 at each time point but also information on the car state and the call state as on-site data (FIGS. 4A and 4B). In addition, on the basis of the virtual traffic demand that has been created, the simulation data creation unit 110 create not only getting in and out data of the elevator 130 at each time point (for example, the number of people in each car, the number of people getting in and out in a time zone of a predetermined length, or the like), but also information on the car state (for example, the location of each car, the moving direction, and the operation status of the destination floor button at each time point) and the call state (for example, the operation status of the call button on each floor at each time point) (FIGS. 5B, 5C).

The real-time conversion model creation unit 106 and the offline conversion model creation unit 102 calculate not only the number of people on board but also conversion feature quantities including the car state and the call state described above, and creates a conversion model based on the conversion feature quantity. At this time, the real-time conversion model creation unit 106 and the offline conversion model creation unit 102 may cause the parameter calculated on the basis of the car state and the call state to be included in the conversion feature quantity. For example, the real-time conversion model creation unit 106 and the offline conversion model creation unit 102 may calculate the arrival frequency of the car on each floor for each time zone of a predetermined length and may cause the arrival frequency to be included in the conversion feature quantity. As a result, accuracy of the conversion model is expected to be improved.

However, the real-time conversion model creation unit 106 and the offline conversion model creation unit 102 do not necessarily have to use all of the pieces of information described above. For example, the real-time conversion model creation unit 106 and the offline conversion model creation unit 102 may calculate the conversion feature quantity only on the basis of the getting in and out data of each car at each time point, or may add minimum information as necessary to calculate the conversion feature quantity.

In addition, in the present embodiment, the prediction model learning unit 113 may learn a prediction model corresponding to the time zone having a predetermined attribute, and the prediction unit 116 may use the prediction model corresponding to the attribute of the time zone in which the number of people who appear is to be predicted. Here, the time zone having a predetermined attribute may be, for example, a morning clock-in time zone, a lunch break time zone, an evening clock-out time zone, a night time zone, or the like in a day, may be a predetermined day of the week, or may be a day corresponding to a predetermined event (for example, a business day, a holiday, or the like of a company in a building in which the elevator 130 is installed).

Here, a case where the time zone having a predetermined attribute is Monday and the method of FIG. 14B is used will be described as an example. The prediction model learning unit 113 extracts the numbers 803 and 1201 of people on Monday from the converted appearance database 122. Here, the number 803 of people who appear on Monday is data converted by applying the past getting in and out/appearance conversion model to the number 801 of people on board or the like in the on-site data acquired on Monday, and the number 1201 of people who appear on Monday is data converted by applying the future getting in and out/appearance conversion model to the number 801 of people on board or the like in the on-site data acquired on Monday.

The prediction model learning unit 113 learns a prediction model for predicting the number 1201 of people who appear in the time zone 1402 on Monday from the number 803 of people who appear in the time zone 1401 on Monday, as the prediction model on Monday. This date is retained as date 1501 in the model database. The date 1501 may be a value indicating a specific day as illustrated in FIG. 15, or a value indicating a day of the week (for example, Monday). Alternatively, in a case where the prediction model corresponding to a specific time zone in a day is stored, the date 1501 may be a value indicating the time zone. In addition, for example, in a case where a prediction model corresponding to a time zone in which a day of the week and a specific time zone in a day are combined is stored, the date 1501 may be a value indicating the combination described above.

Thereafter, in a case where the real-time process 320 is executed on Monday, for example, the prediction unit 116 applies the past getting in and out/appearance conversion model to the number 1601 of people on board or the like before the current time point of the day when the real-time process 320 is performed to acquire the number 1603 of people who appear, and applies the prediction model on Monday to the number 1603 of people who appear to predict the number 1606 of people who appear after the current time point.

Trends of the number of people who appear and the number of people on board or the like may differ depending on, for example, the day of the week, the time zone in a day, the operating status of the tenant of the building, or the like. However, by creating a prediction model according to the time zone as described above and using the prediction model corresponding to the time zone for which prediction is made, it is expected that the number of people who appear can be predicted with higher accuracy.

According to Embodiment 1 of the present invention as described above, the number of people who appear can be predicted on the basis of information that can be acquired from the elevator itself, such as the number of people getting in and out the elevator car, the location of the elevator car, the moving direction of the elevator car, or operation of the destination button and the call button. As a result, it is possible to realize elevator operation that improves user satisfaction, such as reduction of waiting time, without requiring expensive additional equipment such as a camera installed in the elevator hall.

Embodiment 2

Embodiment 2 of the present invention will be described with reference to the drawings. Since each unit of the system of Embodiment 2 has the same function as that of each unit of Embodiment 1 illustrated in FIGS. 1 to 16 having the same reference sign except for the differences described below, description thereof will be omitted.

Figure 17:
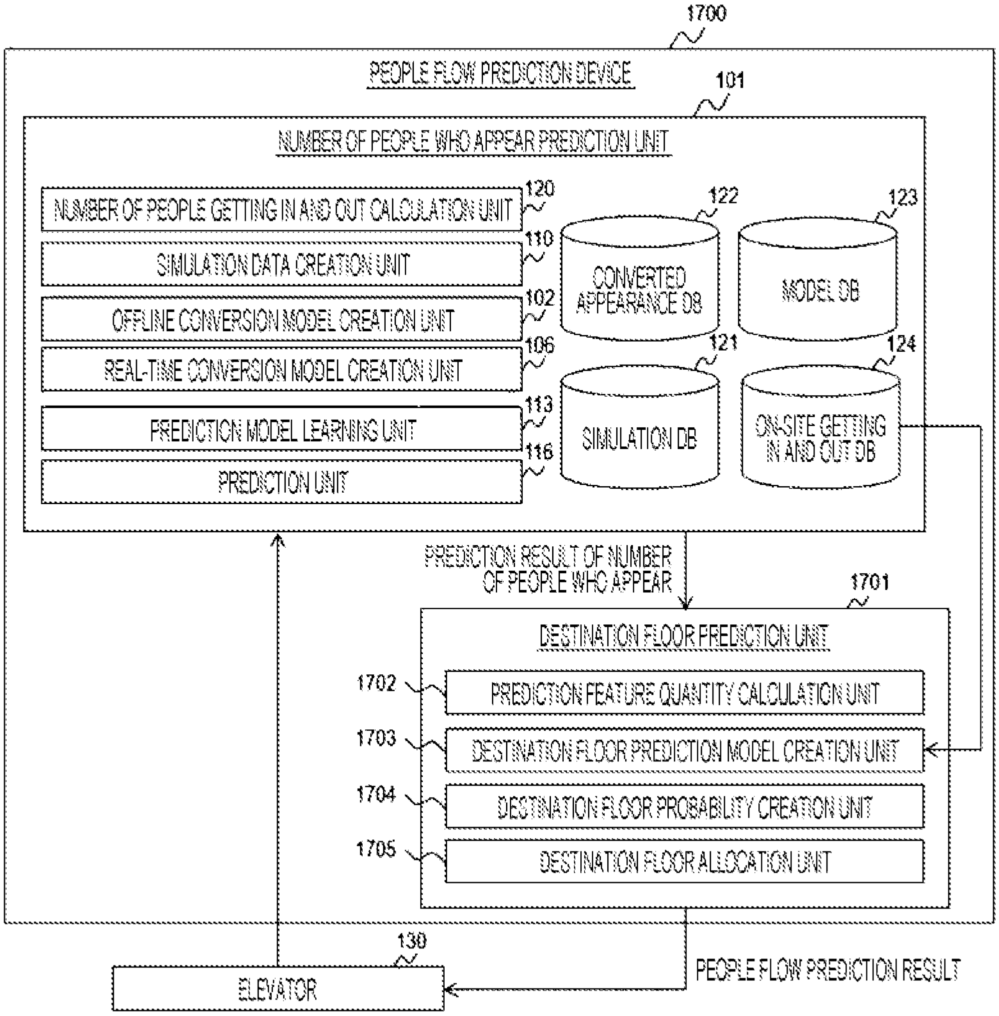
FIG. 17 is a functional block diagram illustrating a configuration of a people flow prediction device according to Embodiment 2 of the present invention.

FIG. 17 is a functional block diagram illustrating a configuration of a people flow prediction device 1700 according to Embodiment 2 of the present invention.

The people flow prediction device 1700 of Embodiment 2 has a destination floor prediction unit 1701 in addition to the number of people who appear prediction unit 101 described in Embodiment 1. The destination floor prediction unit 1701 has a prediction feature quantity calculation unit 1702, a destination floor prediction model creation unit 1703, a destination floor probability creation unit 1704, and a destination floor allocation unit 1705. Similarly to Embodiment 1, the process executed by each unit described above is actually executed by a processor 204 according to the program corresponding to each unit stored in a main storage device 205 (See FIG. 2).

For example, the prediction feature quantity calculation unit 1702 calculates the feature quantities of a departure floor 422, a destination floor 423, and the number of people 424 for each time zone of a predetermined length included in a past on-site getting in and out data stored in an on-site getting in and out database 124. The destination floor prediction model creation unit 1703 creates a destination floor prediction model for predicting a departure floor 422, a destination floor 423, and the number of people 424 in the time zone after the time zone of the on-site getting in and out data that is the basis of calculation of the feature quantities that have been calculated from the feature quantities.

The destination floor probability creation unit 1704 creates a destination floor probability indicating what percentage of the people who appeared on each floor will go to which floor on the basis of the destination floor prediction model that has been created. Then, the destination floor allocation unit 1705 multiplies the prediction result of the number of people who appear obtained by the prediction unit 116 by the destination floor probability to output to the elevator 130 the prediction result of the number of people who appear in each destination floor, that is, the result of predicting how many of the number of people predicted to appear on each floor will go to which floor, as the people flow prediction result.

As described above, according to Embodiment 2 of the present invention, it is possible to plan the operation of the elevator more suitable for an actual demand by predicting not only the number of people who appear on each floor but also the number of people who appear on each destination floor, which leads to an improvement of user satisfaction.

Embodiment 3

Embodiment 3 of the present invention will be described with reference to the drawings. Since each unit of the system of Embodiment 3 has the same function as that of each unit of Embodiment 1 illustrated in FIGS. 1 to 16 or each unit of Embodiment 2 illustrated in FIG. 17 having the same reference sign except for the differences described below, description thereof will be omitted.

Figure 18:
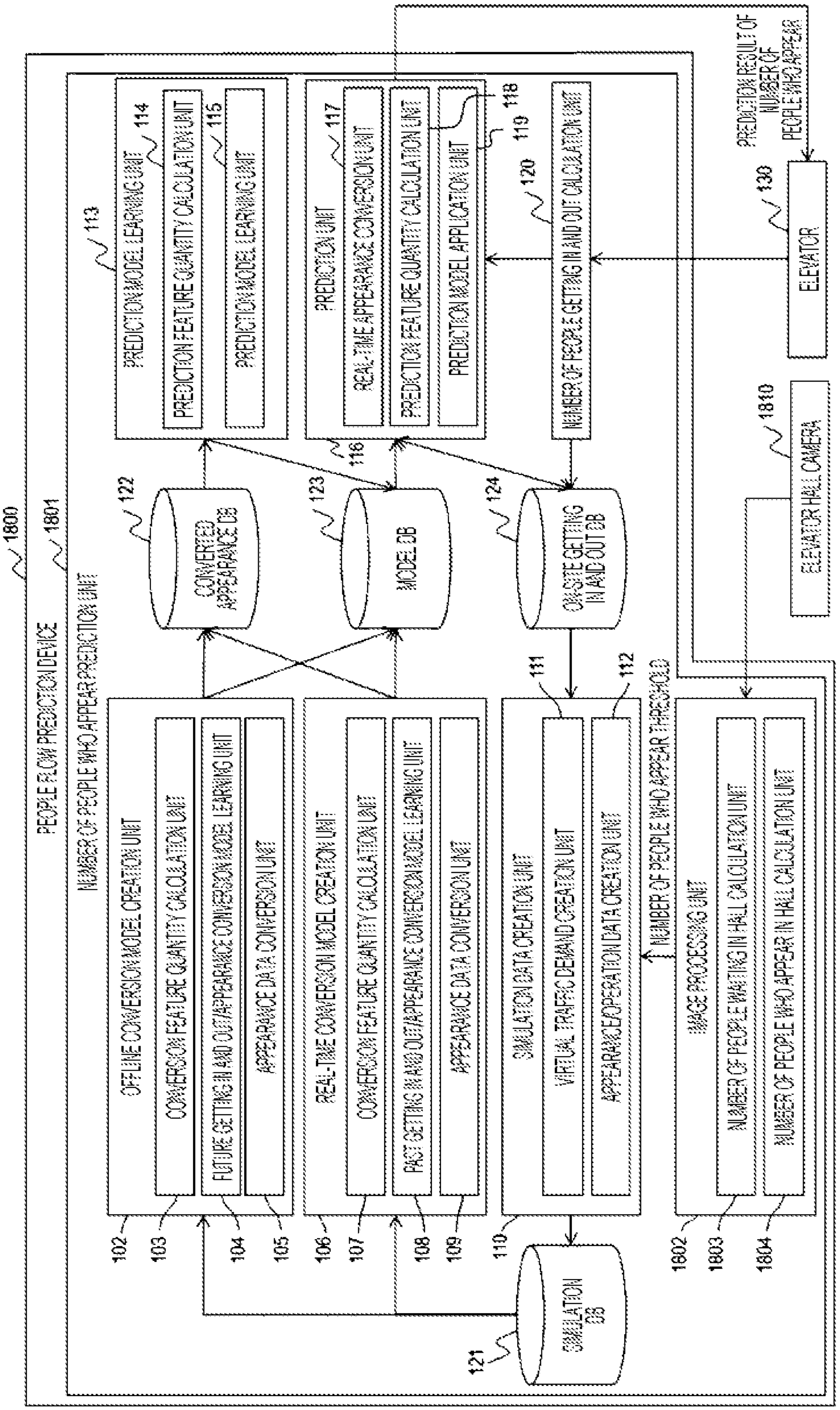
FIG. 18 is a functional block diagram illustrating a configuration of a people flow prediction device according to Embodiment 3 of the present invention.

FIG. 18 is a functional block diagram illustrating a configuration of a people flow prediction device 1800 according to Embodiment 3 of the present invention.

The people flow prediction device 1800 of Embodiment 3 has a number of people who appear prediction unit 1801. The number of people who appear prediction unit 1801 is similar to the number of people who appear prediction unit 101 of Embodiment 1 except that an image processing unit 1802 is added. The image processing unit 1802 has a number of people waiting in a hall calculation unit 1803 and a number of people who appear in a hall calculation unit 1804. Similarly to Embodiment 1, the process executed by each unit described above in the following description is actually executed by a processor 204 according to the program corresponding to each unit stored in a main storage device 205 (See FIG. 2).

In addition, an elevator hall camera 1810 is installed at a landing (that is, an elevator hall) of the elevator 130 on each floor. The elevator hall camera 1810 transmits captured image data to the people flow prediction device 1800. The people flow prediction device 1800 stores the image data received via an interface 201 in the main storage device 205 or an auxiliary storage device 206 (see FIG. 2). The image processing unit 1802 refers to the image data that is stored and executes the process to be described later.

Figure 19:
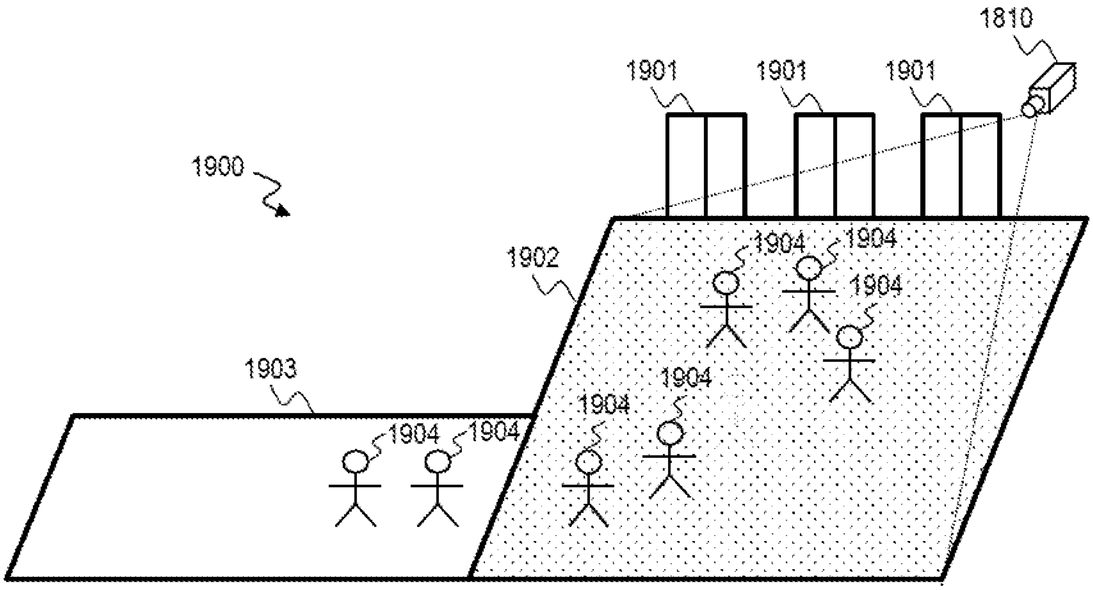
FIG. 19 is an explanatory diagram of an elevator hall in which an elevator hall camera of Embodiment 3 of the present invention is installed.

FIG. 19 is an explanatory diagram of the elevator hall in which the elevator hall camera 1810 of Embodiment 3 of the present invention is installed.

FIG. 19 illustrates, as an example, an elevator hall 1900 on any floor of a building in which the elevator 130 is installed. Three doors 1901 are doors for getting in and out three elevators belonging to the elevator 130. The elevator hall camera 1810 is installed to photograph the inside of the elevator hall 1900. However, the elevator hall 1900 includes an area 1902 that can be photographed by the elevator hall camera 1810 and an area 1903 that cannot be photographed by the elevator hall camera 1810 because the field of view of the elevator hall camera 1810 is obstructed by a wall or the like. In the example of FIG. 19, out of seven people 1904 in the elevator hall 1900, five people in the area 1902 are photographed by the elevator hall camera 1810, but two people in the area 1903 are not photographed.

The area 1903 that cannot be photographed may include an area where the field of view of the elevator hall camera 1810 is obstructed by a wall, a pillar, building equipment, or the like, an area where the field of view is obstructed by another person 1904, an area where brightness of the illumination is insufficient, the area outside the field of view of the elevator hall camera 1810, and the like.

The number of people waiting in the hall calculation unit 1803 of the image processing unit 1802 analyzes image data in each time point captured by the elevator hall camera 1810, and calculates the number of people included in the captured image as the number of people waiting in the area 1902 that can be photographed in the elevator hall 1900. Since this calculation is enabled by a known image recognition technique, detailed description thereof will be omitted.

The number of people who appear in the hall calculation unit 1804 of the image processing unit 1802 calculates the number of people who appear at each time point from the number of people waiting at each time point, calculated by the number of people waiting in the hall calculation unit 1803.

Figure 20:
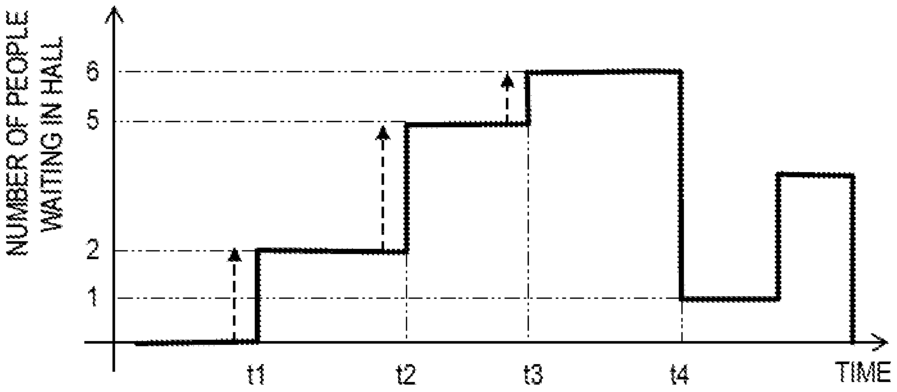
FIG. 20 is an explanatory diagram for calculating the number of people who appear executed by a number of people who appear in a hall calculation unit according to Embodiment 3 of the present invention.

FIG. 20 is an explanatory diagram for calculating the number of people who appear executed by number of people who appear in the hall calculation unit 1804 according to Embodiment 3 of the present invention.

The horizontal axis of the graph in FIG. 20 represents time, and the vertical axis represents the number of people waiting calculated by the number of people waiting in the hall calculation unit 1803. The number of people who appear in the hall calculation unit 1804 detects a change over time in the number of people waiting, calculated by the number of people waiting in the hall calculation unit 1803, and calculates an increase in the number of people waiting as the number of people who appear.

For example, in a case where the number of people waiting before a time point t1 is 0, the number of people waiting from the time point t1 to a time point t2 is 2, the number of people waiting from the time point t2 to a time point t3 is 5, the number of people waiting from time the time point t3 to a time point t4 is 6, and the number of people waiting after the time point t4 is 1, the number of people who appear in the hall calculation unit 1804 calculates the numbers of people who appear at the time points t1, t2, and t3 as 2, 3, and 1, respectively. Then, it is calculated that one of the cars of the elevator arrived at the floor at the time point t4 and five people got in the car.

The image processing unit 1802 transmits the number of people who appear at each time point calculated in this manner to the simulation data creation unit 110. The virtual traffic demand creation unit 111 of the simulation data creation unit 110 creates a virtual traffic demand on the basis of the number of people who appear that has been received.

Specifically, as illustrated in FIG. 20, since the number of people who appear transmitted from the image processing unit 1802 does not include the number of people who appear in the area 1903 that cannot be photographed, the virtual traffic demand creation unit 111 may create a virtual traffic demand, by adding, for example, a random number to the number of people who appear received from the image processing unit 1802. At this time, the upper limit of the number of people to be added may be set on the basis of the structure of the elevator hall 1900. In addition, in consideration of another people blocking the field of view, the upper limit of the number of people to be added may be set so as to increase as the number of waiting people increases.

As described above, according to Embodiment 3 of the present invention, by creating simulation data on the basis of the number of people who appear actually observed, a more realistic simulation can be performed and a highly accurate conversion model and a highly accurate prediction model can be efficiently created.

Note that the present invention is not limited to the above-described embodiments, but includes various modifications. For example, the above-described embodiments are described in detail for better understanding of the present invention, and the present invention is not necessarily limited to those having all the configurations described above. Furthermore, part of the configuration of one embodiment can be replaced with the configuration of another embodiment, and the configuration of one embodiment can be added to the configuration of another embodiment. Furthermore, it is possible to add, delete, or replace another configuration to, from, or with part of the configuration of each embodiment.

In addition, each of the above-described configurations, functions, processing units, processing means, and the like may be partially or entirely realized by hardware, for example, by designing hardware with an integrated circuit. Furthermore, the above-described respective configurations, functions, and the like may be realized by software causing a processor to interpret and execute a program for realizing the respective functions. Information of a program, a table, a file, or the like that realizes each function can be stored in a storage device such as a non-volatile semiconductor memory, a hard disk drive, or an SSD (Solid State Drive), or a non-transitory computer-readable data storage medium such as an IC card, an SD card, or a DVD.

Furthermore, control lines and information lines indicate those considered necessary for the description, and do not necessarily indicate all the control lines and information lines necessary for a product. In fact, it can be considered that almost all components are interconnected.

The invention claimed is:

1. A people flow prediction method executed by a computer system having a processor and a storage device connected to the processor, the method comprising:

calculating, by the processor, a number of people who got in an elevator in a past on a basis of information of a sensor installed in the elevator and creating on-site getting in and out data including the number of people calculated;

creating, by the processor, virtual getting in and out data including at least a number of people who get in the elevator by making a person who arrives at each of a plurality of landings of the elevator in order to use the elevator virtually appear and simulating operation of the elevator on a basis of a number of people who appear;

creating, by the processor, a first conversion model for converting the virtual getting in and out data before a certain time point into the number of people who appear after the certain time point on a basis of the number of people who appear and the virtual getting in and out data;

creating, by the processor, a second conversion model for converting the virtual getting in and out data after a certain time point into the number of people who appear before the certain time point on a basis of the number of people who appear and the virtual getting in and out data;

learning, by the processor, a prediction model for predicting the number of people who appear after a certain time point from the number of people who appear before the certain time point on a basis of the number of people who appear converted by the second conversion model;

predicting, by the processor, the number of people who appear after a certain time point from the on-site getting in and out data before the certain time point by using the first conversion model and the prediction model; and controlling operation of the elevator based on a prediction of the number of people who appear after a certain time point from the on-site getting in and out data before the certain time point.

2. The people flow prediction method according to claim 1, wherein the processor calculates a first number of people who appear by applying the first conversion model to the on-site getting in and out data, the processor calculates a second number of people who appear by applying the second conversion model to the on-site getting in and out data, and the processor learns a prediction model for predicting the second number of people who appear after a certain time point from the first number of people who appear before the certain time point.

3. The people flow prediction method according to claim 1, wherein the on-site getting in and out data further includes at least one of operation performed for a call button of the elevator on each floor, operation performed for a destination floor button in the elevator, and arrival frequency of the elevator on each floor, and the processor creates the virtual getting in and out data further including at least one of the operation for the call button of the elevator on each floor, the operation for the destination floor button in the elevator, and the arrival frequency of the elevator on each floor by simulating operation of the elevator on a basis of the number of people who appear.

4. The people flow prediction method according to claim 1, wherein in the prediction model learning procedure, the processor learns a prediction model corresponding to a time zone having a predetermined attribute, the prediction model for predicting the number of people who appear after a certain time point in the time zone having the predetermined attribute from the number of people who appear before the certain time point on a basis of the number of people who appear calculated by applying the second conversion model to the on-site getting in and out data in the time zone having the predetermined attribute, and in the predicting procedure, the processor uses the first conversion model and the prediction model corresponding to the time zone having the predetermined attribute to predict the number of people who appear after a certain time point in the time zone having the predetermined attribute from the on-site getting in and out data before the certain time point.

5. The people flow prediction method according to claim 4, wherein the time zone having the predetermined attribute is one of a time zone in each day, a predetermined day of a week, and a day corresponding to a predetermined event.

6. The people flow prediction method according to claim 1, wherein in the simulation data creating procedure, the processor calculates distribution of a number of people who get in the elevator on a basis of the on-site getting in and out data, and makes a person who arrives at each of the landings of the elevator in order to use the elevator to virtually appear on the basis of the distribution calculated.

7. The people flow prediction method according to claim 1 further comprising:

a procedure in which the processor creates a destination floor prediction model for predicting a destination floor of a person who gets in the elevator on a basis of the on-site getting in and out data; and a procedure in which the processor predicts the number of people who appear on each destination floor on a basis of the destination floor prediction model and the number of people who appear predicted in the predicting procedure.

8. The people flow prediction method according to claim 1 further comprising an image processing procedure in which the processor calculates a number of people included in an image on a basis of the image obtained by photographing one of the landings of the elevator, wherein in the simulation data creating procedure, the processor makes a person who arrives at each of the landings of the elevator in order to use the elevator virtually appear on a basis of the number of people calculated in the image processing procedure.

9. The people flow prediction method according to claim 8, wherein in the simulation data creating procedure, the processor makes a number of people obtained by adding a number of people calculated in a predetermined manner to the number of people calculated in the image processing procedure, as a number of people who arrive at each landing of the elevator in order to use the elevator virtually appear.

10. A people flow prediction system comprising:

a processor configured to calculate a number of people who got in an elevator in a past on a basis of information of a sensor installed in the elevator and create on-site getting in and out data including the number of people calculated;

a simulation data creation unit which creates virtual getting in and out data including at least a number of people who get in the elevator by making a person who arrives at each of landings of the elevator in order to use the elevator virtually appear and simulating operation of the elevator on a basis of a number of people who appear;

a first conversion model creation unit which creates a first conversion model for converting the virtual getting in and out data before a certain time point into the number of people who appear after the certain time point on a basis of the number of people who appear and the virtual getting in and out data;

a second conversion model creation unit which creates a second conversion model for converting the virtual getting in and out data after a certain time point into the number of people who appear before the certain time point on a basis of the number of people who appear and the virtual getting in and out data;

a prediction model learning unit which learns a prediction model for predicting the number of people who appear after a certain time point from the number of people who appear before the certain time point on a basis of the number of people who appear converted by the second conversion model; and a prediction unit which predicts the number of people who appear after a certain time point from the on-site getting in and out data before the certain time point by using the first conversion model and the prediction model;

wherein the processor is configured to control operation of the elevator based on a prediction of the number of people who appear after a certain time point from the on-site getting in and out data before the certain time point.

11. The people flow prediction system according to claim 10, wherein the first conversion model creation unit calculates a first number of people who appear by applying the first conversion model to the on-site getting in and out data, the second conversion model creation unit calculates a second number of people who appear by applying the second conversion model to the on-site getting in and out data, and the prediction model learning unit learns a prediction model for predicting the second number of people who appear after a certain time point from the first number of people who appear before the certain time point.

* * * * *